(12) United States Patent
Lee et al.

(10) Patent No.: US 8,381,018 B2
(45) Date of Patent: Feb. 19, 2013

(54) METHOD FOR DATA RECOVERY FOR FLASH DEVICES

(75) Inventors: Chia-Wen Lee, Hsinchu County (TW);
Shih-Hsin Chen, Hsinchu County (TW);
Shih-Ta Hung, Taoyuan County (TW);
Ping-Sheng Chen, Hsinchu County (TW); Po-Ching Lu, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 294 days.

(21) Appl. No.: 12/784,593

(22) Filed: May 21, 2010

(65) Prior Publication Data
US 2011/0289352 A1  Nov. 24, 2011

(51) Int. Cl.
*G06F 11/00* (2006.01)

(52) U.S. Cl. ............ 714/6.1; 714/6.11; 714/15; 714/42; 711/202

(58) Field of Classification Search ............... 714/5, 5.1, 714/6.1, 6.11, 6.3, 15, 20, 42; 711/103, 202
See application file for complete search history.

(56) References Cited

U.S. PATENT DOCUMENTS

| | | | |
|---|---|---|---|
| 5,043,940 A | 8/1991 | Harari | |
| 5,172,338 A | 12/1992 | Mehrotra et al. | |
| 5,341,330 A | 8/1994 | Wells et al. | |
| 6,711,663 B2 | 3/2004 | Lai et al. | |
| 6,763,424 B2 | 7/2004 | Conley | |
| 6,968,421 B2 | 11/2005 | Conley | |
| 7,107,389 B2 | 9/2006 | Inagaki et al. | |
| 7,127,551 B2 | 10/2006 | Beck | |
| 7,139,864 B2 | 11/2006 | Bennett et al. | |
| 7,818,610 B2 * | 10/2010 | Rogers et al. | 714/15 |
| 2002/0188814 A1 | 12/2002 | Saito et al. | |
| 2005/0120266 A1 | 6/2005 | Cernea | |
| 2007/0016721 A1 * | 1/2007 | Gay | 711/103 |
| 2009/0198947 A1 * | 8/2009 | Khmelnitsky et al. | 711/202 |
| 2010/0138592 A1 * | 6/2010 | Cheon | 711/103 |
| 2011/0072189 A1 * | 3/2011 | Post et al. | 711/103 |
| 2011/0106804 A1 * | 5/2011 | Keeler et al. | 711/200 |
| 2011/0131231 A1 * | 6/2011 | Haas et al. | 711/103 |

FOREIGN PATENT DOCUMENTS

CN     1420440     5/2003

OTHER PUBLICATIONS

English language translation of abstract of CN 1420440 (published May 28, 2003).

* cited by examiner

*Primary Examiner* — Joseph D Manoskey
(74) *Attorney, Agent, or Firm* — McClure, Qualey & Rodack, LLP

(57) ABSTRACT

The invention provides a method for data recovery. In one embodiment, a memory comprises a plurality of pages for data storage. First, first data is obtained from a host. A first page for storing the first data is then selected from the pages of the memory. A start page link indicating the first page is then stored in the memory. The first data, a first page link indicating a next page, and first FTL fragment data corresponding to the first page are then written into the first page. Next data is then obtained from the host. The next data, a next page link indicating a subsequent page, and FTL fragment data corresponding to the next page are written into the next page.

34 Claims, 17 Drawing Sheets

METHOD FOR DATA RECOVERY FOR FLASH DEVICES

BACKGROUND OF THE INVENTION

1. Field of the Invention

The invention relates to flash devices, and more particularly to data recovery of flash devices.

2. Description of the Related Art

A flash device, such as a memory card, is a device comprising a flash memory for data storage. A flash memory is a non-volatile memory that can be electrically erased and reprogrammed. A flash device stores data for a host such as a personal computer. When the host wants to store data to the flash device, the host sends data along with a logical address of the data to the flash device, wherein the logical address indicates the location at which the data is to be stored. The flash memory, however, stores data according to physical addresses. The flash device therefore must first convert the logical address sent by the host into a physical address, and then directs the flash memory to store the data in the memory space with the physical address. The flash device therefore comprises a microprocessor capable of converting logical addresses of the host into physical addresses of the flash memory.

To convert logical addresses into physical addresses, the flash device therefore has to record a mapping relationship between logical addresses and physical addresses. The mapping relationship between logical addresses and physical addresses is referred to as flash-translation-layer (FTL) data. The FTL data is often stored in the flash memory of the flash device. When the flash device is enabled, the microprocessor loads the FTL data from the flash memory to a dynamic random access memory (DRAM) of the flash device, and then the microprocessor converts logical addresses into physical addresses according to the FTL data stored in the DRAM.

Whenever a time period has passed, the microprocessor of the flash device must update the FTL data stored in the flash memory according to the latest FTL data stored in the DRAM, thus the FTL data stored in the flash memory is kept to be identical with the latest FTL data stored in the DRAM. However, when power of the flash device is suddenly shut down, the FTL data stored in the flash memory has no time to be updated, and the latest FTL data stored in the DRAM is lost due to the sudden shut down of power. After the power of the flash device is regained, the microprocessor of the flash device must first recover the latest FTL data. Otherwise, because the version of FTL data stored in the flash memory is not the latest data version, the microprocessor would convert logical addresses into physical addresses according to wrong information of the FTL data. For example, when the host requests the flash device to read data, the flash device may read an old physical address of the flash memory to obtain wrong data. When the host requests the flash device to write data thereto, the flash device may mistake a used data block as an empty data block and overwrite data in the used data block. Thus, a method for recovering the latest FTL data for a flash device is required.

BRIEF SUMMARY OF THE INVENTION

The invention provides a method for data recovery. In one embodiment, a memory comprises a plurality of pages for data storage, a random access memory stores flash-translation-layer (FTL) data according to a mapping relationship between logical addresses and physical addresses of the pages, and the memory stores a previous version of the FTL data. First, first data is obtained from a host. A first page for storing the first data is then selected from the pages of the memory. A start page link indicating the first page is then stored in the memory. The first data, a first page link indicating a next page, and first FTL fragment data corresponding to the first page are then written into the first page. Next data is then obtained from the host. Finally, the next data, a next page link indicating a subsequent page, and FTL fragment data corresponding to the next page are written into the next page.

The invention also provides a flash device capable of data recovery. In one embodiment, the flash device comprises a flash memory, a random access memory, and a microprocessor. The memory comprises a plurality of pages for data storage. The random access memory stores flash-translation-layer (FTL) data according to a mapping relationship between logical addresses and physical addresses of the pages. The microprocessor obtains first data from a host, selects a first page for storing the first data from the pages of the memory, stores a start page link indicating the first page in the memory, writes the first data, a first page link indicating a next page, and first FTL fragment data corresponding to the first page into the first page, obtains next data from the host, and writes the next data, a next page link indicating a subsequent page, and FTL fragment data corresponding to the next page into the next page.

A method for data recovery for a flash device is provided. In one embodiment, a flash memory of the flash device comprises a plurality of pages for data storage, a random access memory stores flash-translation-layer data recording to a mapping relationship between logical addresses and physical addresses of the pages, and the flash memory stores a previous version of the FTL data. First, first data is obtained from a host. A first page for storing first data is then selected from the pages of the flash memory. The first data, a first page link indicating the previous version of the FTL data, and first FTL fragment data corresponding to the first page are then written into the first page. Next data is then obtained from the host. Finally, the next data, a previous page link indicating the first page, and FTL fragment data corresponding to a next page are then written into the next page.

The invention provides a method for data recovery for a flash device. In one embodiment, a flash memory of the flash device comprises a plurality of blocks, and each of the blocks comprises a plurality of pages for data storage. When data is written to a target page of a target block selected from the blocks, a block type and a physical block number of the target block are recorded in the target page. After power of the flash device is recovered, whether the target block is a garbage collection block is determined according to the block types and the physical block numbers stored in the pages of the target block. Finally, flash-translation-layer (FTL) data recorded a mapping relationship between logical numbers and physical numbers is rebuilt according to whether the target block is a garbage collection block.

A device capable of data recovery is provided. In one embodiment, the device comprises a memory and a microcontroller. The memory comprises a plurality of blocks, wherein each of the blocks comprises a plurality of pages for data storage. The microcontroller records a block type and a physical block number of a target block in a target page when data is written into the target page, determines whether the target block is a garbage collection block according to the block types and the physical block numbers stored in the pages of the target block after power of the device is recovered, and rebuilds flash-translation-layer (FTL) data recorded a mapping relationship between logical numbers and physical numbers according to the determining result.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
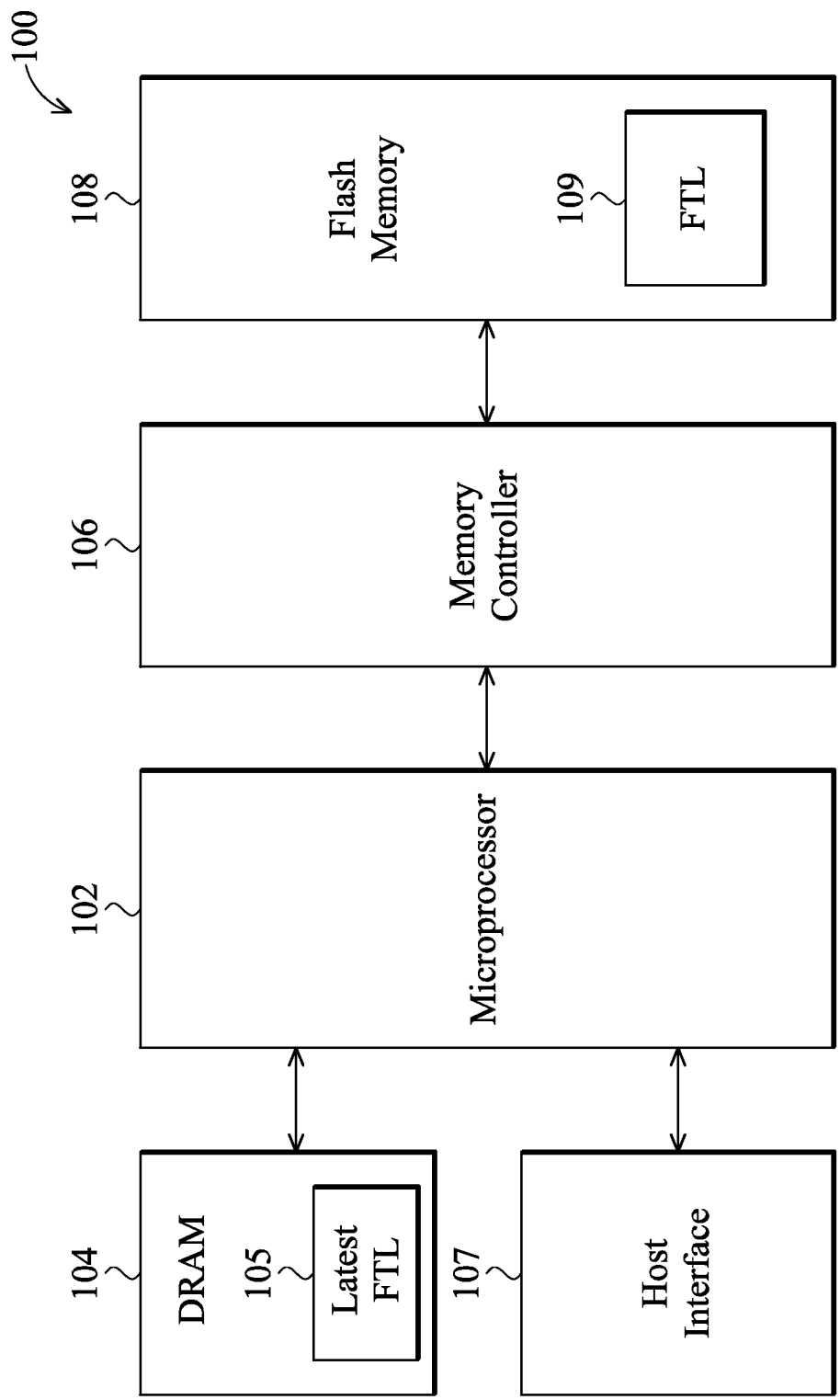
FIG. 1 is a block diagram of a flash device according to the invention.

FIG. 1 is a block diagram of a device 100 according to the invention. The device 100 comprises a microprocessor 102, a dynamic random access memory (DRAM) 104, a memory controller 106, a memory 108, and a host interface 107. For example, the memory 108 can be a flash memory and the device 100 can be a flash device. The device 100 stores data for a host. The host interface 107 is responsible for data communication between the host and the microprocessor 102. The DRAM 104 stores data for the microprocessor 102.

The memory controller 106 controls operations of the flash memory 108. The flash memory 108 comprises a plurality of blocks, and each of the blocks comprises a plurality of pages for data storage. The flash memory 108 stores a flash-transaction-layer (FTL) data 109 which records a mapping relationship between logical addresses used by the host and physical addresses used by the flash memory 108. When the device 100 is enabled, the microprocessor 102 loads the FTL data to the DRAM 104, and converts logical addresses received from the host into physical addresses according to the FTL data 105 stored in the DRAM. The microprocessor 102 also records new mapping relationship between logical addresses and physical addresses in the FTL data 105 stored in the DRAM 104. The FTL data 105 stored in the DRAM 104 therefore comprises a latest version of the address mapping relationships.

Because the latest FTL data 105 stored in the DRAM 104 has some differences with the FTL data 109 stored in the flash memory 108, the microprocessor 102 has to keep the FTL data 109 identical with the latest FTL data 105. Whenever a predetermined time period has passed, the microprocessor 102 updates the FTL 109 stored in the flash memory 108 according to the latest FTL data 105 stored in the DRAM 104. However, when power of the device 100 is suddenly shut down, the microprocessor 102 has no time to update the FTL data 109 stored in the flash memory 108, and the latest FTL data 105 stored in the DRAM 104 is lost due to shut down of power. After the device 100 regains power, the microprocessor 102 has to recover the latest FTL data 105 for address conversion. To reference the latest FTL data 105, whenever data is written to new pages, the microprocessor 102 writes some information into new pages along with the data.

Figure 2A:
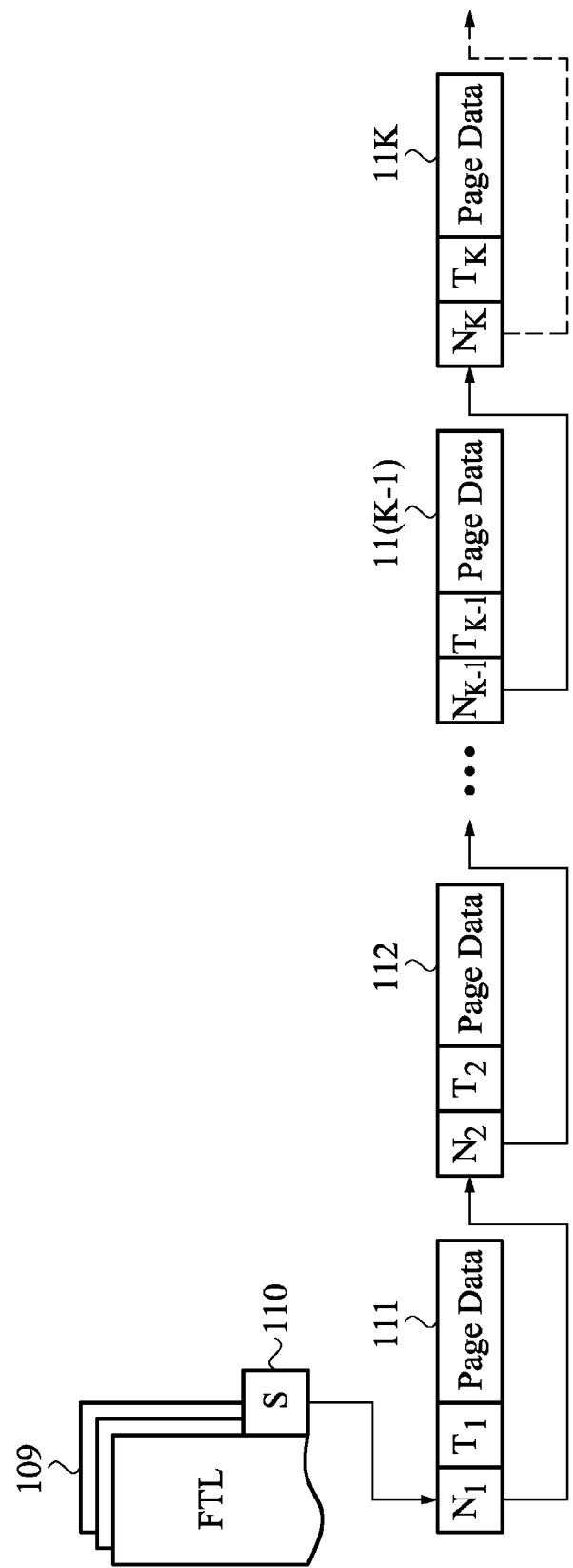
FIG. 2A is a schematic diagram of an embodiment of a method for writing FTL recovery information to pages of a flash memory according to the invention.

Referring to FIG. 2A, a schematic diagram of an embodiment of a method for writing FTL recovery information to pages of a flash memory 108 according to the invention is shown. The microprocessor 102 first updates the FTL data 109 stored in the flash memory 108 according to the latest FTL data 105 stored in the DRAM 104, wherein the FTL data 109 is identical to the latest FTL data 105. Assume that the host wants to write a series of data to the device 100, and the host interface 107 sequentially receives the data series from the host. The microprocessor 102 first determines a first page 111 of the flash memory 108 for storing first data of the data series. The microprocessor 102 then records a start page link 110 indicating a physical address of the first page 111 in the flash memory 108. The microprocessor 102 then directs the memory controller 106 to write the first data to the first page 111. When the first data is written to the first page 111, the microprocessor 102 also directs the memory controller 106 to write a next page link $N_1$ (i.e. the next page link $N_1$ can be seen as a first page link) and FTL fragment data $T_1$ (i.e. the FTL fragment data $T_1$ can be seen as first FTL fragment data) to the first page 111, wherein the next page link $N_1$ indicates a physical address of a second page 112 (i.e. the second page 112 can be seen as a next page from the first page 111), and the FTL fragment data $T_1$ is update data of the latest FTL data 105 corresponding to data written to the first page 111.

The microprocessor 102 then directs the memory controller 106 to write second data of the data series to the second page 112. When the second data is written to the second page 112, the microprocessor 102 also directs the memory controller 106 to write a next page link $N_2$ and FTL fragment data $T_2$ to the second page 112, wherein the next page link $N_2$ indicates a physical address of a third page, and the FTL fragment data $T_2$ is update data of the latest FTL data 105 corresponding to data written to the second page 112. The microcontroller 102 then writes data to subsequent pages (such as the $11_K$-th page is a subsequent page from the $11(K-1)_{th}$ page) in the same way as the first page 111 and the second page 112. In other words, whenever the microcontroller 102 writes data to a new page, the microcontroller 102 also writes a next page link indicating a physical address of a subsequent page and FTL fragment data corresponding to data written to the new page. Finally, the microprocessor 102 writes final data of the data series, a next page link $N_K$, and FTL fragment data $T_K$ to a final page 11K, wherein the next page link $N_K$ points to NULL. When a power of a conventional flash device is suddenly shut down, latest FTL data stored in the DRAM 104 is lost, and the microcontroller 102 cannot recover data stored in a plurality of blocks storing recent data. Because each pages shown in FIG. 2A stores FTL fragment data and a next page link pointing to a next page, when a power of the device 100 is suddenly shut down, the microcontroller 102 can regain the pages 111~11K according to the next page links and recover latest FTL data according to the FTL fragment data, and no data is lost. The device 100 according to the invention therefore has a better performance than the conventional flash device.

Figure 2B:
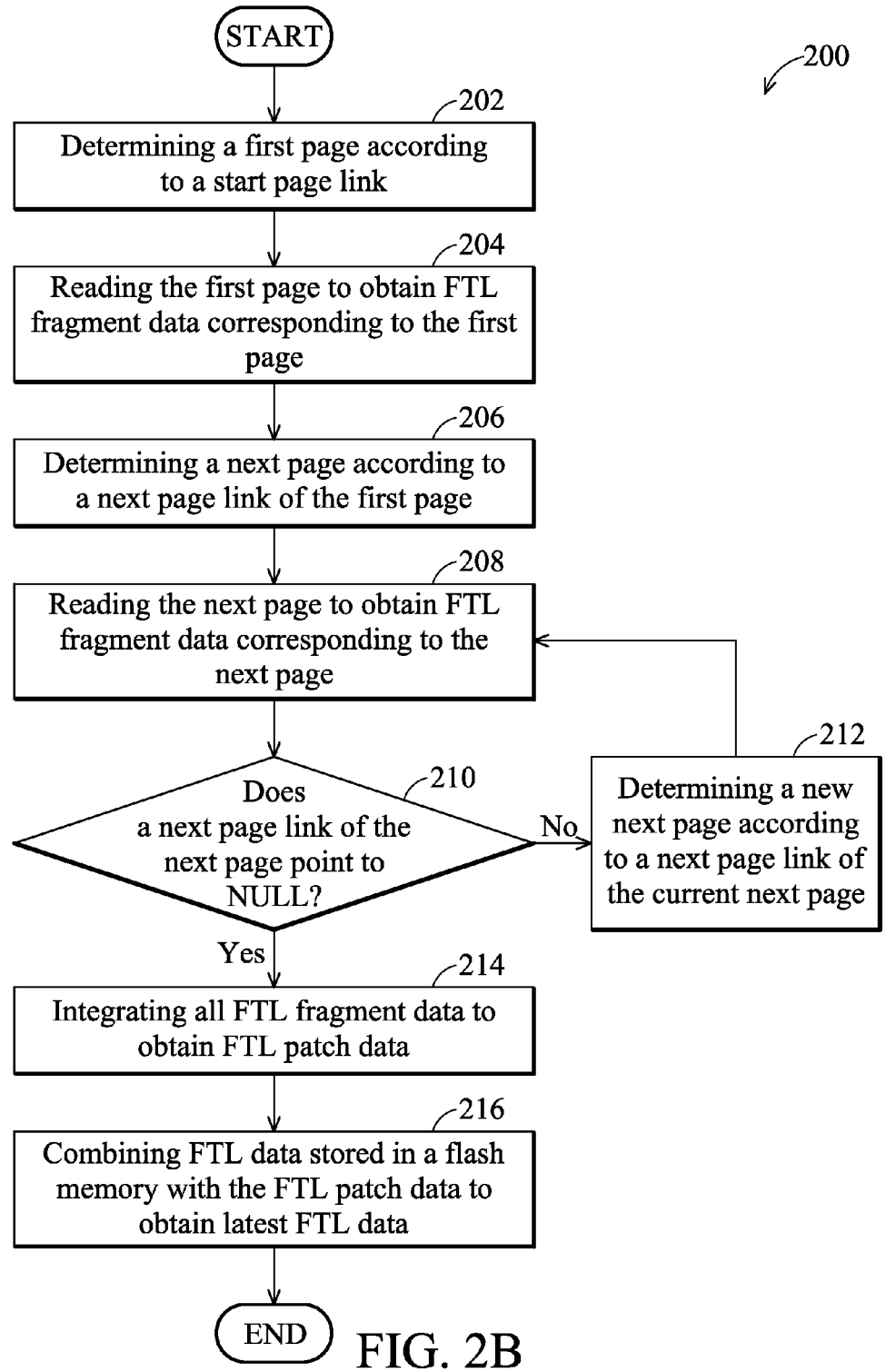
FIG. 2B is a flowchart of a method for recovering the latest FTL data according to the invention.

Assume that power of the device 100 is suddenly shut down, and the latest FTL data 105 stored in the DRAM 104 is lost. After the device 100 regains power, the microcontroller 102 has to recovery the latest FTL data 105. Referring to FIG. 2B, a flowchart of a method 200 for recovering the latest FTL data according to the invention is shown. First, the microcontroller 102 determines a first page 111 for storing data according to a start page link 110 stored in the flash memory 108 (step 202). The microprocessor 102 then directs the memory controller 106 to read the first page 111 to obtain the FTL fragment data $T_1$ (can be seen as a first FTL fragment) corresponding to the first page (step 204). Because the next page link $N_1$ of the first page 111 has already stored a physical address of another next page 112, the microcontroller 102 then determines the next page 112 according to the next page link $N_1$ of the first page 111 (step 206). The microcontroller 102 then directs the memory controller 106 to read the next page 112 to obtain the FTL fragment data corresponding to the next page 112 (step 208).

Because a prior page always stores a next page link indicating a physical address of a next page (step 212), the microcontroller 102 continues to read the next page to gather the FTL fragment data corresponding to the next pages (step 208). Finally, the microcontroller 102 determines that a final page 11K has already stored a next page link pointing to NULL (step 210). After the microcontroller 102 reads the final page 11K to obtain the FTL fragment data corresponding to the final page 11K, the microcontroller 102 then integrates the FTL fragment data of all of the pages 111~11K to obtain FTL patch data, wherein the FTL patch data comprises FTL update data corresponding to data written in all pages 111~11K (step 214). For example, the FTL fragment data $T_1$~$T_K$ of the pages 111~11K may comprise information about a logical block number and a block type of a block containing the pages 111~11K to support rebuilding a latest FTL data. The microcontroller 102 can therefore combine the FTL fragment data $T_1$~$T_K$ of the pages 111~11K to obtain the FTL patch data which is lost information of the original FTL data 109 stored in the flash memory 108. Finally, the microcontroller 102 combines the FTL data 109 stored in the flash memory 108 with the FTL patch data to recover the latest FTL data 105 before the power supply is shut off (step 216). After the latest FTL data is recovered, the microprocessor 102 can then convert logical addresses received from the host into physical addresses according to the address mapping relationship contained in the latest FTL data 105, and then access data stored in the flash memory 108 according to the physical addresses.

Figure 3A:
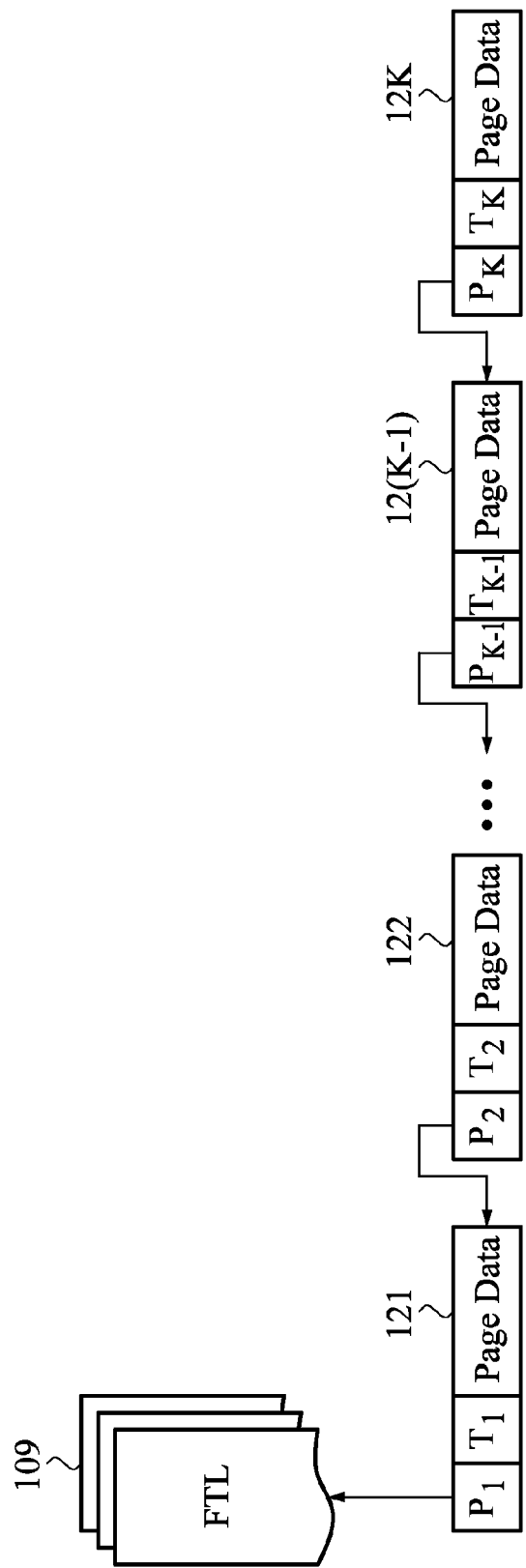
FIG. 3A is a schematic diagram of another embodiment of a method for writing FTL recovery information to pages of a flash memory according to the invention.

Referring to FIG. 3A, a schematic diagram of another embodiment of a method for writing FTL recovery information to pages of a flash memory 108 according to the invention is shown. The microprocessor 102 first updates the FTL data 109 stored in the flash memory 108 according to the latest FTL data 105 stored in the DRAM 104, wherein the FTL data 109 is identical to the latest FTL data 105. Assume that the host wants to write a series of data to the device 100, and the host interface 107 sequentially receives the data series from the host. The microprocessor 102 first determines a first page 121 of the flash memory 108 for storing first data of the data series. The microprocessor 102 then directs the memory controller 106 to write the first data to the first page 121. When the first data is written to the first page 121, the microprocessor 102 also directs the memory controller 106 to write a previous page link $P_1$ and FTL fragment data $T_1$ to the first page 121, wherein the previous page link $P_1$ indicates a physical address of the FTL data 109 stored in the flash memory 108, and the FTL fragment data $T_1$ is update data of the latest FTL data 105 corresponding to data written to the first page 121.

The microprocessor 102 then determines a second page 122 for storing second data of the data series and directs the memory controller 106 to write the second data to the second page 122. When the second data is written to the second page 122, the microprocessor 102 also directs the memory controller 106 to write a previous page link $P_2$ and FTL fragment data $T_2$ (can be seen as a second FTL fragment) to the second page 122, wherein the previous page link $P_2$ indicates a physical address of the first page 121, and the FTL fragment data $T_2$ is update data of the latest FTL data 105 corresponding to data written to the second page 122. The microcontroller 102 then writes data to subsequent pages in the same way as the first page 121 and the second page 122. In other words, whenever the microcontroller 102 writes data to a new page, the microcontroller 102 also writes a previous page link indicating a physical address of a prior page and FTL fragment data corresponding to data written to the new page. Finally, the microprocessor 102 writes final data of the data series, a previous page link $P_K$, and FTL fragment data $T_K$ to a final page 12K, wherein the previous page link $P_K$ indicates a physical address of a prior page 12(K-1).

Figure 3B:
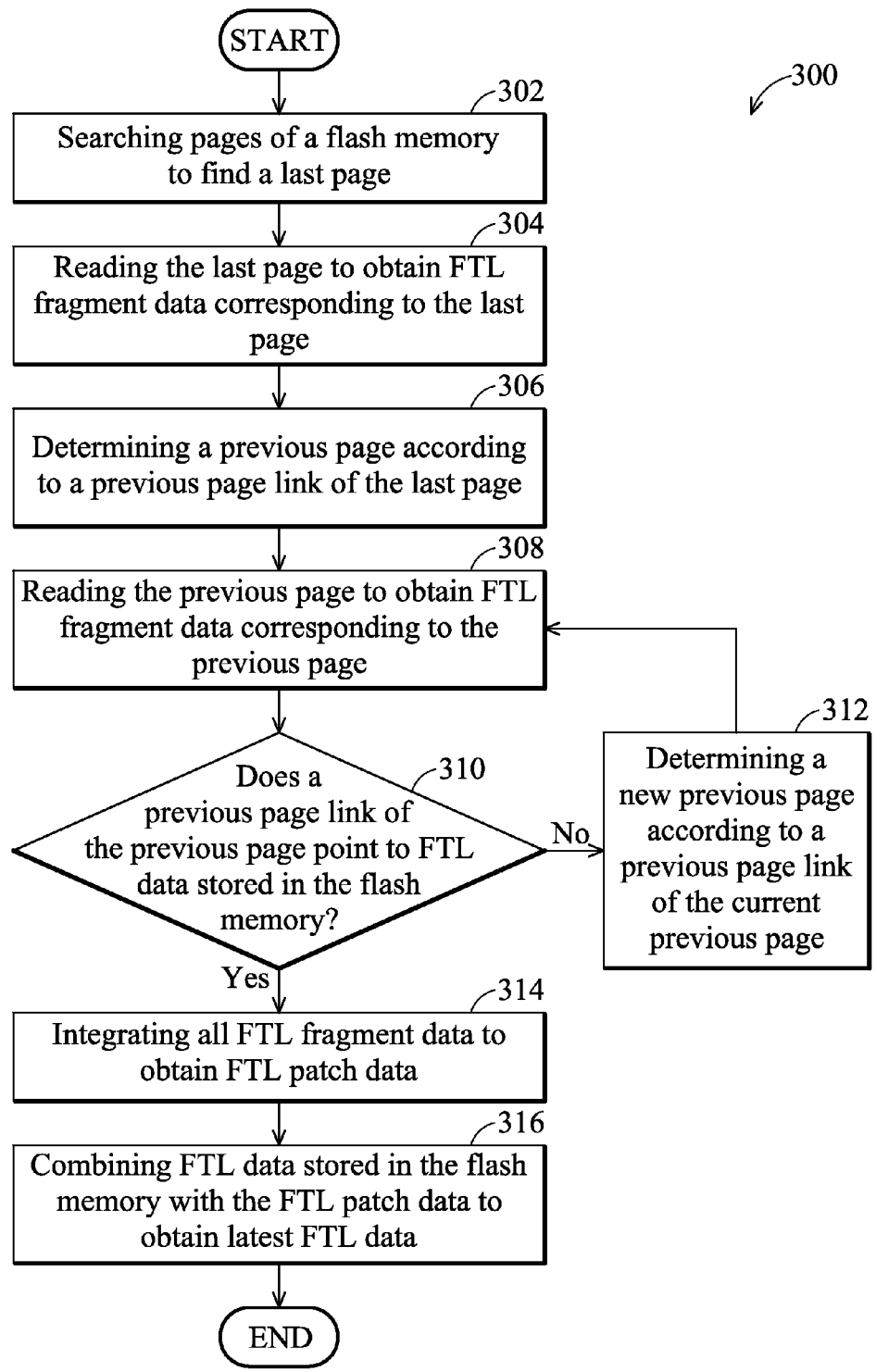
FIG. 3B is a flowchart of a method for recovering the latest FTL data according to the invention.

Assume that power of the device 100 is suddenly shut down, and the latest FTL data 105 stored in the DRAM 104 is lost. After the device 100 regains power, the microcontroller 102 has to recovery the latest FTL data 105. Referring to FIG. 3B, a flowchart of a method 300 for recovering the latest FTL data according to the invention is shown. First, the microcontroller 102 searches pages of the flash memory 108 to find a last page 12K (step 302). The microprocessor 102 then directs the memory controller 106 to read the last page 12K to obtain the FTL fragment data $T_K$ corresponding to the last page 12K (step 304). Because a previous page link $P_K$ of the last page 12K has already stored a physical address of a previous page 12(K-1), the microcontroller 102 then determines the previous page 12(K-1) according to the previous page link $P_K$ of the last page 12K (step 306). The microcontroller 102 then directs the memory controller 106 to read the previous page 12(K-1) to obtain the FTL fragment data corresponding to the previous page 12(K-1) (step 308).

Because a subsequent page always stores a previous page link indicating a physical address of a previous page (step 312), the microcontroller 102 continues to read the previous page to gather the FTL fragment data corresponding to the previous pages (step 308). Finally, the microcontroller 102 determines that a first page 121 has already stored a previous page link pointing to the FTL data 109 stored in the flash memory 108 (step 310). After the microcontroller 102 reads the first page 121 to obtain the FTL fragment data corresponding to the first page 121, the microcontroller 102 then integrates the FTL fragment data of all of the pages 121~12K to obtain FTL patch data, wherein the FTL patch data comprises FTL update data corresponding to data written to all of the pages 121~12K (step 314). Finally, the microcontroller 102 combines the FTL data 109 stored in the flash memory 108 with the FTL patch data to obtain the latest FTL data 105 (step 316). After the latest FTL data is recovered, the microprocessor 102 can then convert logical addresses received from the host into physical addresses according to the address mapping relationship contained in the latest FTL data 105, and then access data stored in the flash memory 108 according to the physical addresses.

Figure 4:
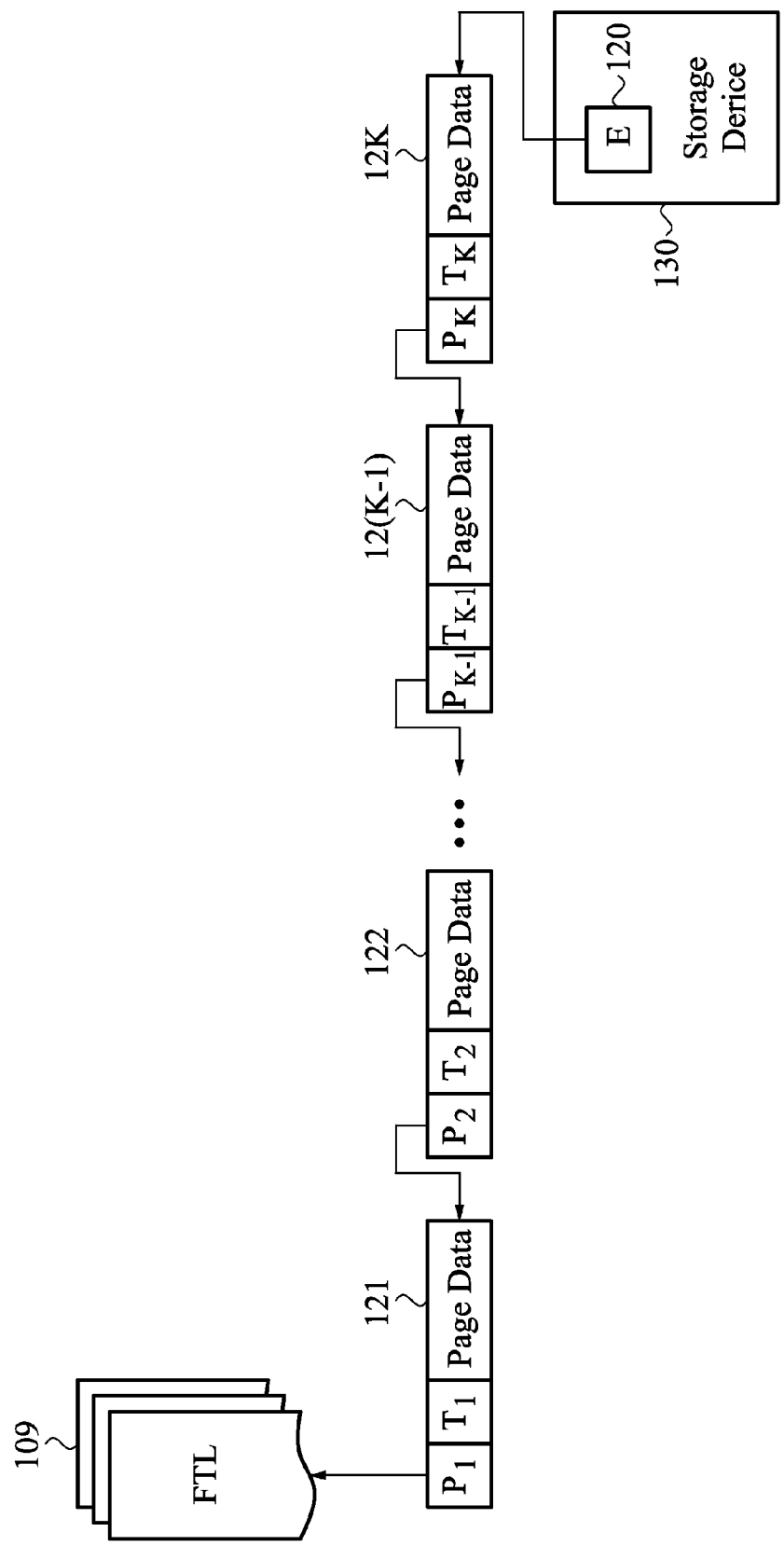
FIG. 4 is a schematic diagram of another embodiment of a method for writing FTL recovery information to pages of a flash memory according to the invention.

Another embodiment shown in FIG. 3A does not comprise an end page link that stores an address of the last page 12K. Thus, when the FTL data recovery process 300 is started, the microprocessor 102 has to search pages of the flash memory 108 to find the last page 12K. The operation for searching for the last page 12K requires a long time period. Referring to FIG. 4, a schematic diagram of another embodiment of a method for writing FTL recovery information to pages of a flash memory 108 according to the invention is shown. The embodiment shown in FIG. 4 is similar to the embodiment shown in FIG. 3A except that a storage device 130 stores an end page link 120. The storage device 130 may be the flash memory 108 or an extra EEPROM. A capacitor is coupled between a power supply and the device 100 to extend a dying gasp period in which the power supply is still on after the power supply is suddenly shut down. During the short dying gasp period, the microprocessor 102 stores the end page link 120 indicating the last page 120 in the storage device 130. Thus, when the microprocessor 102 performs the method 300 to rebuild the latest FTL data 105, the microprocessor 102 can directly find the last page 12K according to the end page link 120 stored in the storage device 130.

Figure 5:
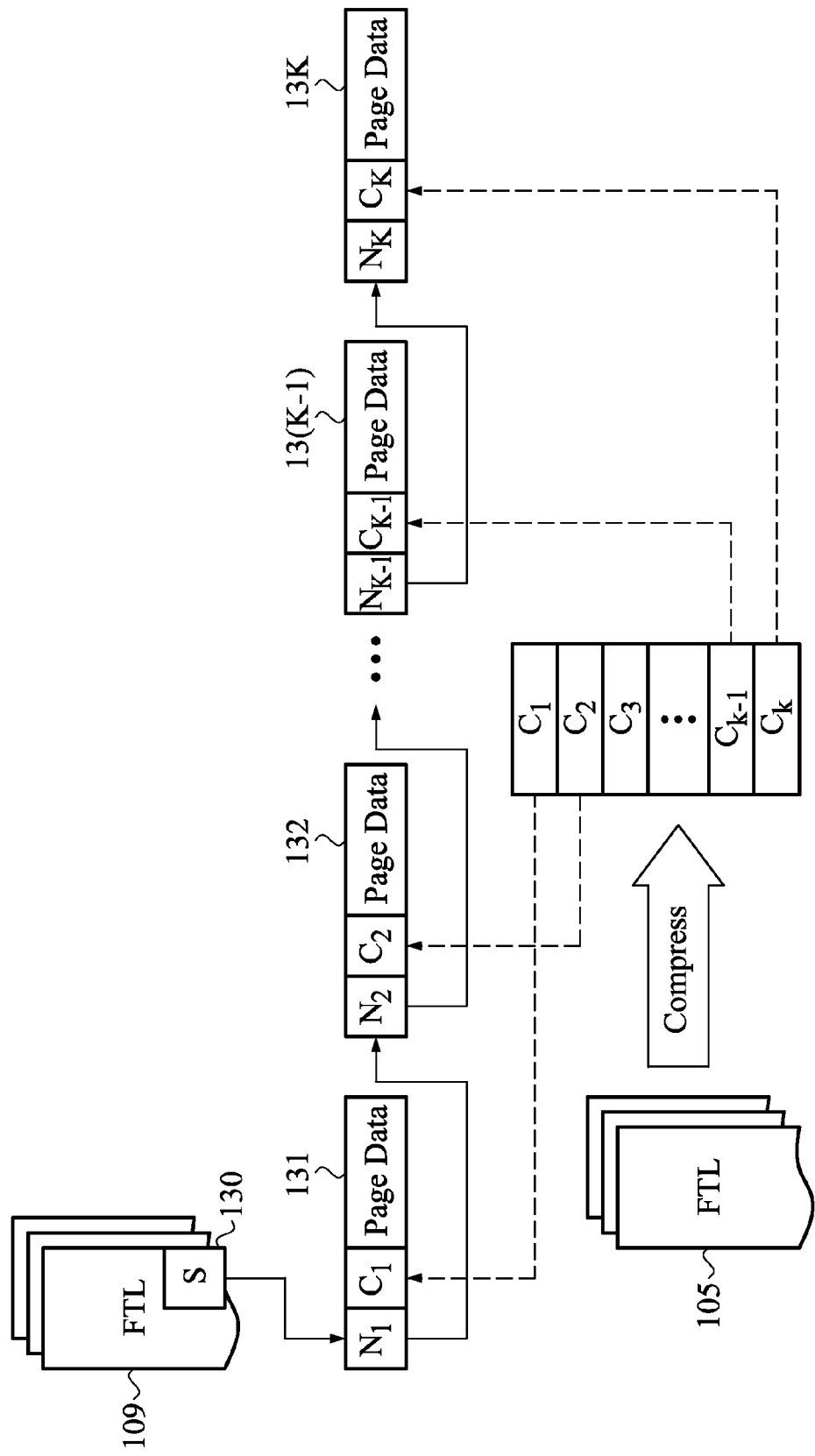
FIG. 5 is a schematic diagram of another embodiment of a method for writing FTL recovery information to pages of a flash memory 108 according to the invention.

Referring to FIG. 5, a schematic diagram of another embodiment of a method for writing FTL recovery information to pages of a flash memory 108 according to the invention is shown. The embodiment shown in FIG. 5 is similar to the embodiment shown in FIG. 2A. The pages 111~11K shown in FIG. 2A store FTL fragment data $T_1$~$T_K$ respectively corresponding to data written to the pages 111~11K. The FTL fragment data $T_1$~$T_K$, however, is not compressed. When the microprocessor 102 writes data to pages 131~13K, the microprocessor 102 also writes compressed FTL fragment data $C_1$~$C_K$ to the pages 131~13K. For example, when first data is written to the first page 131, the latest FTL data 105 must be correspondingly changed to record a mapping relationship between the physical address of the first page 131 and the logical address of the first data. An update data reflecting difference between the latest FTL data 105 and the original FTL data 109 is then compressed to obtain compressed FTL fragment data $C_1$, and the microprocessor 102 then writes the compressed FTL fragment data $C_1$ in the first page 131. Similarly, compressed FTL fragment data $C_2$~$C_K$ corresponding to the pages 132~13K are also written to the pages 132~13K. Thus, the difference data between the latest FTL data 105 and the original FTL data 109 have stored in the compressed FTL fragment data $C_2$~$C_K$ without further logical processing. After power of the device 100 is regained, the microprocessor 102 can decompress the compressed FTL fragment data $C_1$~$C_K$ to obtain FTL patch data which reflects difference between the latest FTL data 105 and the original FTL data 109. The microcontroller 102 can then update the FTL data 109 stored in the flash memory 108 according to the FTL patch data to obtain the latest FTL data 105.

On the other hand, although the fragment FTL data $T_1$~$T_K$ of the pages 111~11K shown in FIG. 2 are logical data generated by logical processing, and difference data between the latest FTL data 105 and the original FTL data 109 must be derived from the fragment FTL data $T_1$~$T_K$ via logical processing of the microprocessor 102. Thus, recovering the latest FTL data 105 according to the compressed FTL fragment data $C_2$~$C_K$ requires a shorter time period than recovering the latest FTL data 105 according to the fragment FTL fragment data $T_1$~$T_K$.

A host coupled to the device 100 may frequently update data with the same logical address number, and the device 100 therefore stores data corresponding to a specific logical block number in a plurality of blocks with different physical block number. For example, a data block corresponding to a logical block number first stores data. When the host wants to write update data to the same logical block number, the device 100 may store the update data in an active block corresponding to the same logical block number. In addition, the microcontroller 102 of the device 100 may integrate data of the data block and the active block to obtain a garbage collection block corresponding to the same logical block number. Thus, performance of accessing the data with continuous logical address but intermittent physical address may be improved. When the power of the device 100 is suddenly shut down, the latest FTL data 105 stored in the DRAM 104 is lost, and the microcontroller 102 has difficulty in determining whether a plurality of blocks corresponding to the same logical block number stores a newest version of data. Thus, a method for determining a newest block from a plurality of blocks corresponding to the same logical block number is required. A logical block number may simultaneously correspond to a data block storing original data, an active block storing update data, and a garbage collection block storing both the original data of the data block and the update data of the active block. The microprocessor 102 then has to determine which one of the blocks corresponding to a logical block number is a newest block, and then stores a mapping relationship between the logical block number and the physical block number of the newest block in the rebuilt latest FTL data.

Because a garbage collection block is obtained by combining a data block and an active block, the garbage collection block is often the newest block in comparison with the active block and the data block. Thus, to determine the newest block from a plurality of blocks corresponding to a logical block number, a microprocessor 102 must first determine whether the blocks are garbage collection blocks, and then selects the newest block from the garbage collection blocks. To better determine a newest block and a garbage collection block from a plurality of blocks, when data is written to a page of a target block, the microcontroller 102 also directs the memory controller 106 to write a block type of the target block and a physical block number of the target block to the page of the target block. Thus, when power of the device 100 is shut down, each page of a block comprises information of a block type of an original block and a physical block number (also referred to as physical block address) of the original block. When the device 100 regains power, the microcontroller 102 can then determine a newest block from a plurality of blocks corresponding to a logical block number according to the block type information and the physical block number information stored in the pages of the blocks.

Figure 6:
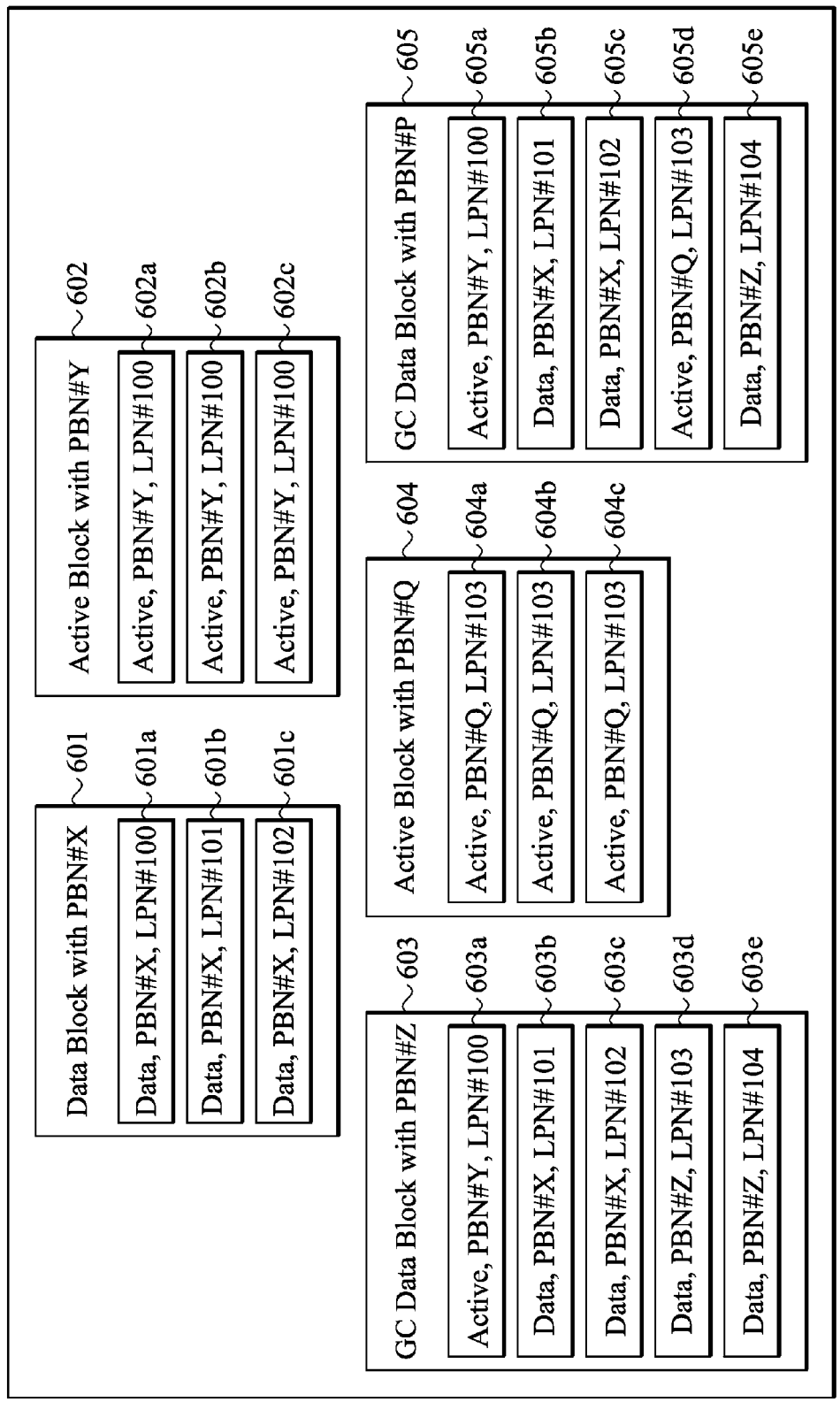
FIG. 6 is a schematic diagram of an embodiment of a plurality of blocks corresponding to a logical block number.

Referring to FIG. 6, a schematic diagram of an embodiment of a plurality of blocks 601~605 corresponding to a logical block number is shown. A block 601 has a block type of "data block" and a physical block number X and comprises three pages 601a~601c. The pages 601a~601c all store block type information of "data block" and a physical block number of "X". A block 602 has a block type of "active block" and a physical block number Y and comprises three pages 602a~602c. The pages 602a~602c all store block type information of "active block", a physical block number of "Y", and a physical block number of corresponding data block of "X". A block 603 has a block type of "data block" and a physical block number Z and comprises five pages 603a~603e. The page 603a stores block type information of "active block" and a physical block number of "Y". The pages 603b~603c store block type information of "data block" and a physical block number of "X". The pages 603d~603e store block type information of "data block" and a physical block number of "Z". A block 604 has a block type of "active block" and a physical block number Q and comprises three pages 604a~604c. A block 605 has a block type of "data block" and a physical block number P and comprises five pages 605a~605e.

Figure 7:
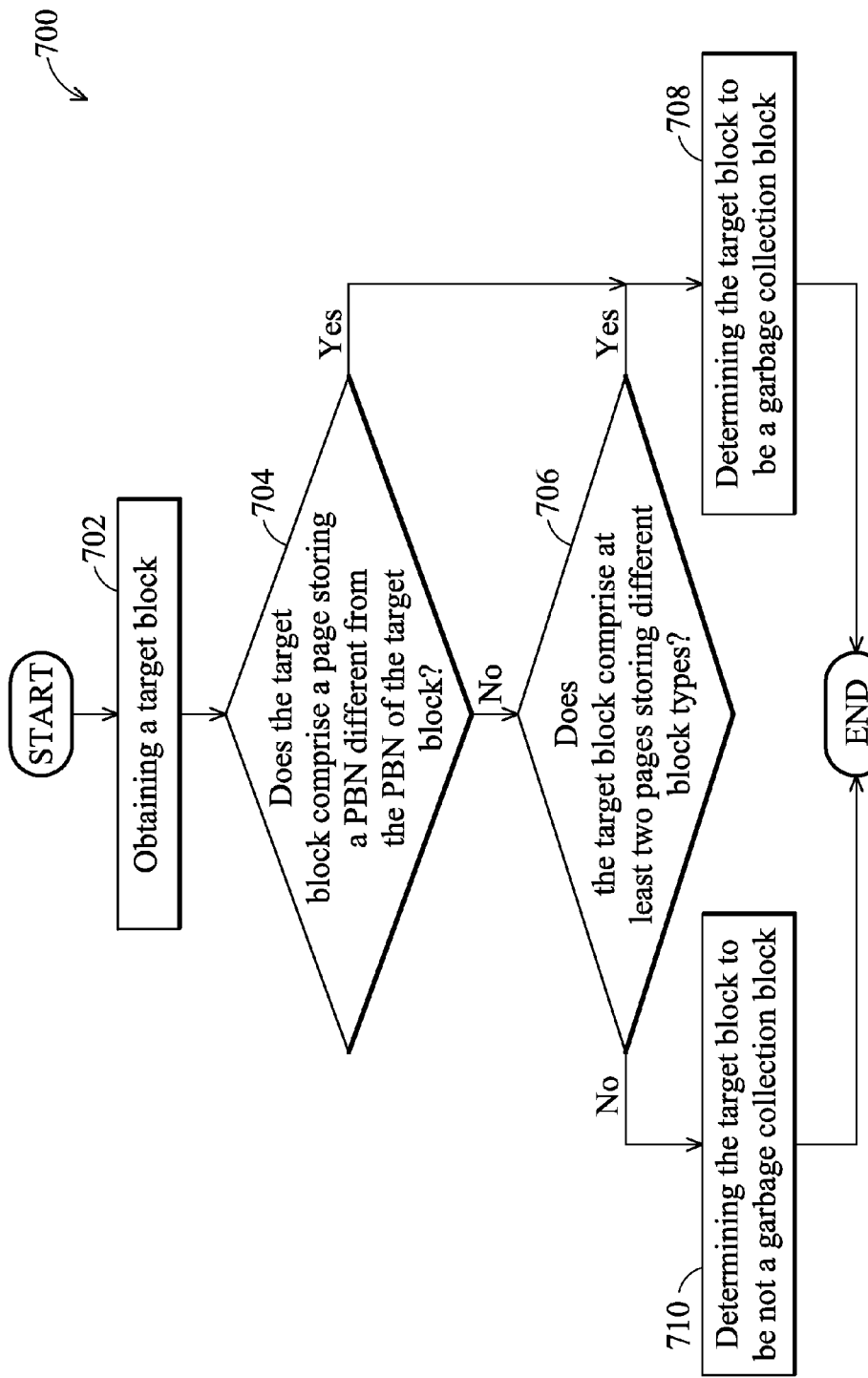
FIG. 7 is a flowchart of a method for determining whether a target block is a garbage collection block.

First, the microcontroller 102 determines whether the blocks 601~605 are garbage collection blocks. Referring to FIG. 7, a flowchart of a method 700 shows the procedure to determine whether a target block is a garbage collection block. First, the microcontroller 102 obtains a target block (step 702). The microcontroller 102 then determines whether the target block comprise a page storing a physical block number that is different from the physical block number of the target block (step 704). If so, the microcontroller 102 determines the target block to be a garbage collection block (step 708). The microcontroller 102 then determines whether the target block comprises at least two pages storing different block type information (step 706). If so, the microcontroller 102 determines the target block to be a garbage collection block (step 708). If all pages of the target block store a physical block number identical to the physical block number of the target block, and the target block does not comprises two pages storing different block type information, the microcontroller 102 determines the target block not to be a garbage collection block (step 710).

For example, all of the pages 601a~601c of the block 601 store a physical block number X which is the physical block number of the block 601, and all pages 601a~601c of the block 601 store the same block type information of "data block". The block 601 is therefore not a garbage collection block. Similarly, all of the pages 602a~602c of the block 602 store a physical block number Y which is the physical block number of the block 602, and all pages 602a~602c of the block 602 store the same block type information of "active block". The block 602 is therefore not a garbage collection block. Similarly, the block 604 is also determined not to be a garbage collection block. The block 603, however, comprises a page 603a storing a physical block number Y which is different from the physical block number Z of the block 603, and page 603b and 603c store physical block numbers X which are different from the physical block number Z of the block 603. In addition, the block 603 comprises a page 603a storing a block type information of "active block" which is different from the block type information "data block" of pages 603b~603e. Thus, the microcontroller 102 determines that the block 603 is a garbage collection block. Similarly, the block 605 is also determined to be a garbage collection block.

Figure 8:
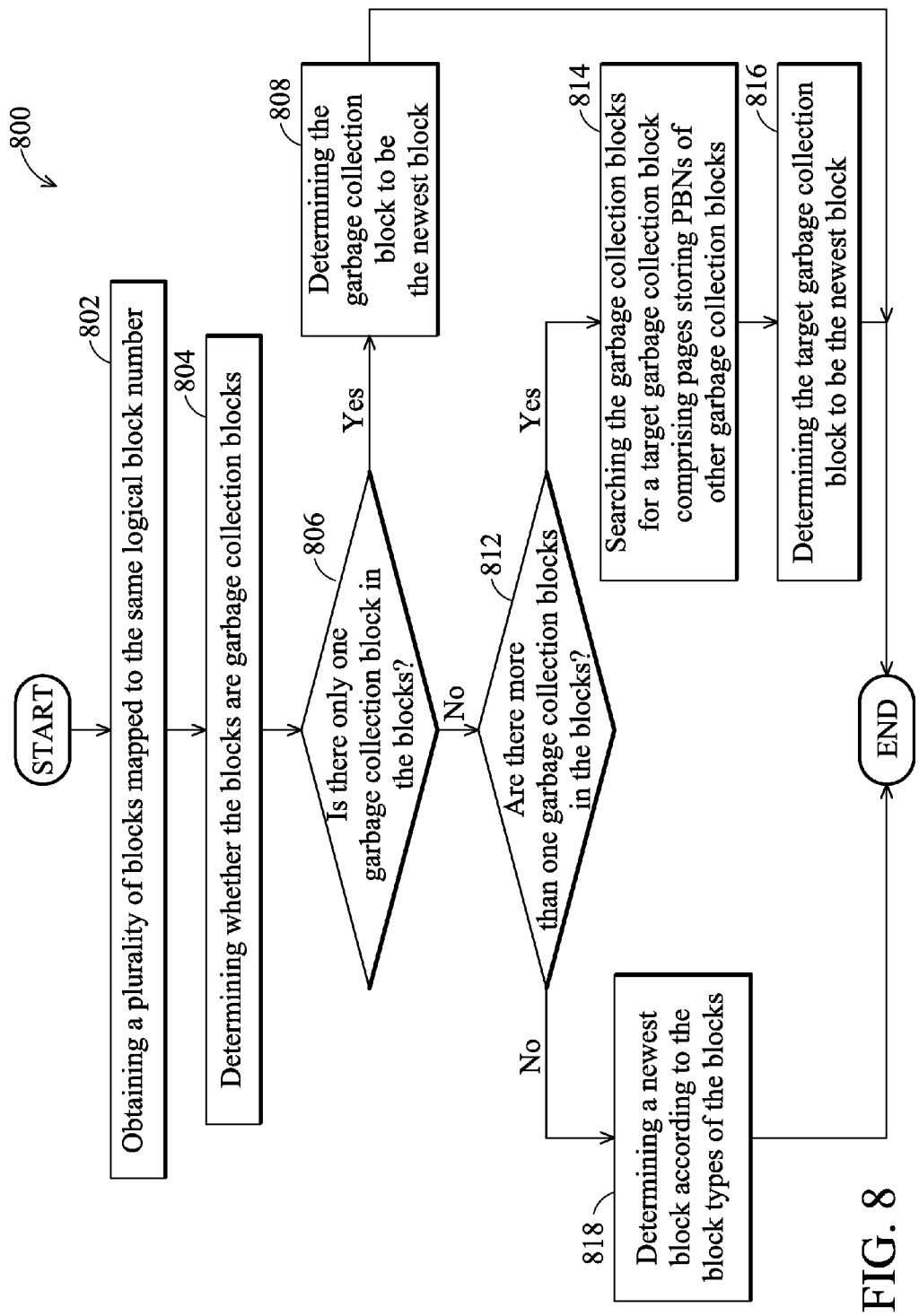
FIG. 8 is a flowchart of a method for determining a newest block from a plurality of blocks corresponding to a logical block number.

The microcontroller 102 therefore determines the block 603 and 605 to be garbage collection blocks. Referring to FIG. 8, a flowchart of a method 800 for determining a newest block from a plurality of blocks corresponding to a logical block number is shown. First, the microcontroller 102 obtains a plurality of blocks 601~605 corresponding to a logical block number (step 802). The microcontroller 102 then determines whether the blocks 601~605 are garbage collection blocks (step 804). According to the method 700 shown in FIG. 7, only the blocks 603 and 605 are determined to be garbage collection blocks. If there is only one block determined to be a garbage collection block (step 806), the microcontroller 102 determines the garbage collection block to be the newest block (step 808). For example, if there are only three blocks 601~603 corresponding to a logical block number, the block 603 is the only garbage collection block, and the block 603 is determined to be the newest block.

Otherwise, if there are more than one block determined to be garbage collection blocks (step 812), the microcontroller 102 searches the garbage collection blocks for a target garbage collection block comprising pages storing PBNs of other garbage collection blocks (step 814), and determines the target garbage collection block to be the newest block (step 816). For example, if the two blocks 603 and 605 are determined as garbage collection blocks, because the block 605 comprises a page 605e storing a physical block number Z which is the physical block number of another garbage collection block 603, the microcontroller 102 determines the block 605 to be the newest block. Otherwise, if there is no block determined to be a garbage collection block, the microcontroller 102 determines a newest block according to the block types of the blocks (step 818). For example, if there are only two blocks 601 and 602 corresponding to a logical block number, because the block 602 is an active block and the block 601 is a data block, the microcontroller 102 determines the active block 602 to be a newest block. Finally, after the newest block is determined, the microcontroller 102 records a mapping relationship between the physical block number of the newest block and the logical block number in the latest FTL data 105 stored in the DRAM 104 to rebuild the latest FTL data 105.

Figure 9:
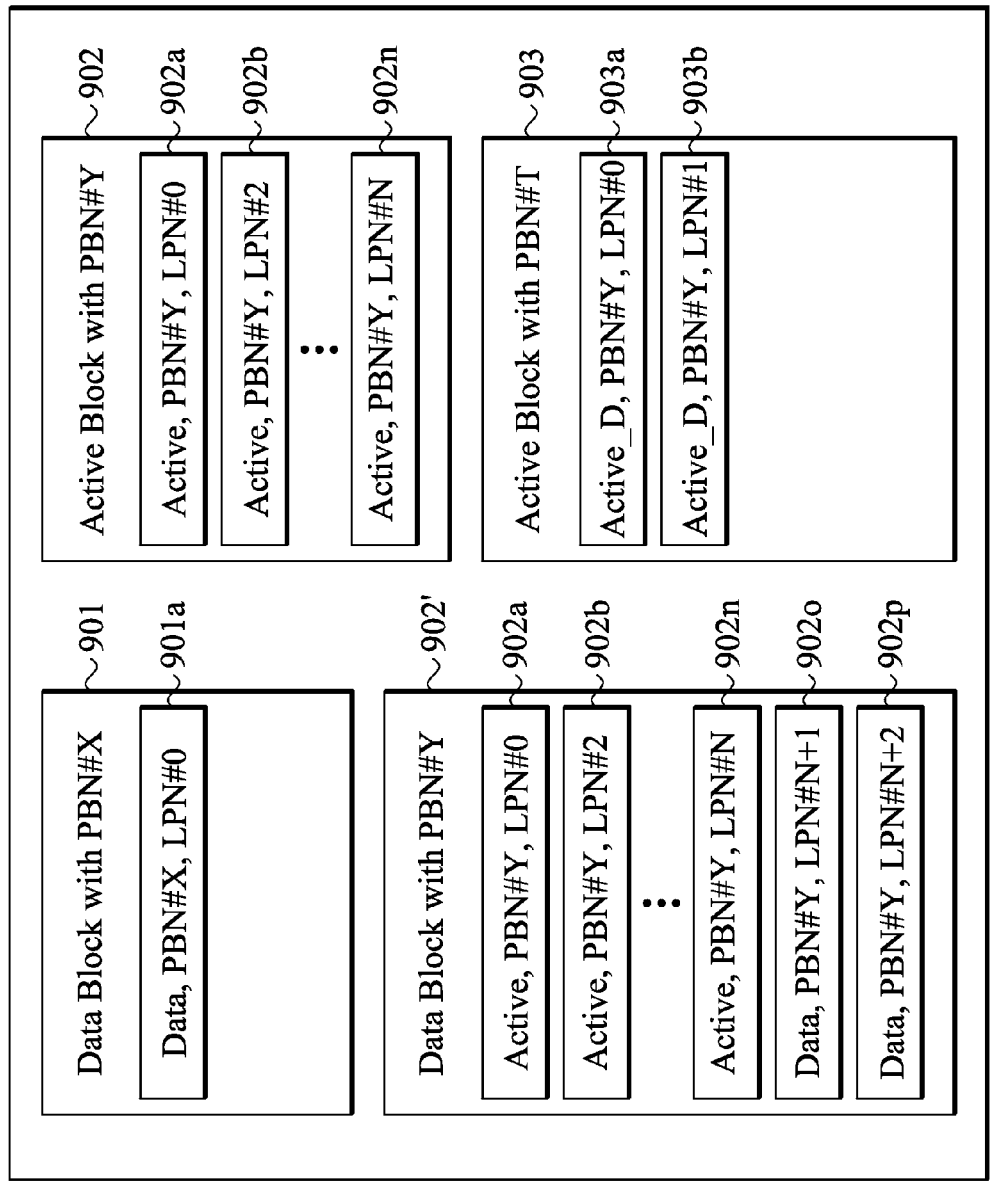
FIG. 9 is a schematic diagram of an embodiment of an active block being switched to a data block.

Referring to FIG. 9, a schematic diagram of an embodiment shows an active block 902 being switched to a data block 902'. A data block 901 corresponds to a logical block number. Data stored in the data block 901 is then updated. The active block 902 is then built to store update data of the data block 901. The microcontroller 102 then switches the active block 902 to the data block 902'. Because the block type of the block 902' has been changed from "active block" to be "data block", new pages 902o and 902p of the block 902' store block type information of "data block". Data stored in the data block 902' is then updated. The microcontroller 102 then builds an active block 903 to store update data of the data block 902'. When the microcontroller 102 stores update data to pages 903a and 903b of the active block 903, the microcontroller 102 also writes block type information of "Active_D" to the pages 903a and 903b to indicate that the block 903 is an active block of a data block 902' which has been switched from an active block.

In the embodiment shown in FIG. 6, when data is written to pages of a target block, the microcontroller 102 only writes information about a block type of the target block and a physical block number of the target block into the pages. In another embodiment, when the microcontroller 102 writes update data to pages of an active block, the microcontroller 102 also writes information about a physical block number of a data block corresponding to the active block to the pages of the active block in additional to information about the block type of the active block and the physical block number of the active block, wherein the active block stores update data for the corresponding data block. The written information about a physical block number of a data block corresponding to an active block is referred to as "a data-source physical block number" (PBNds). After the PBNds information is written to the pages of an active block, the PBNds information stored in the page of the active block is helpful in determining a newest block from a plurality of garbage collection blocks corresponding to the same logical block number.

Figure 10:
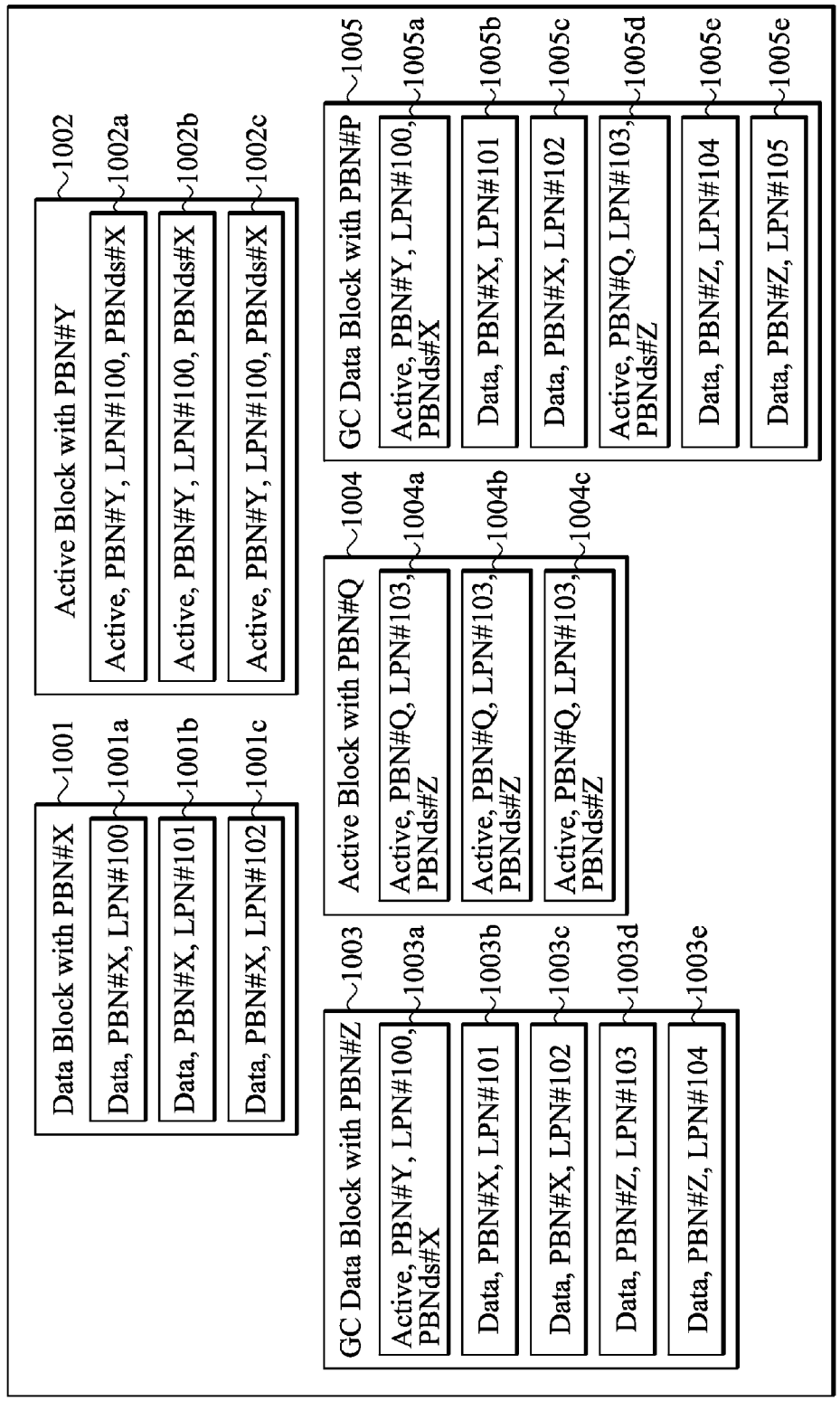
FIG. 10 is a schematic diagram of an embodiment of a plurality of blocks corresponding to a logical block number.

Referring to FIG. 10, a schematic diagram of an embodiment of a plurality of blocks 1001~1005 corresponding to a logical block number is shown. The block 1001 has a block type of "data block" and a physical block number X and comprises three pages 1001a~1001c. The pages 1001a~1001c all store block type information of "data block" and a physical block number of "X". The block 1002 has a block type of "active block" and a physical block number Y and comprises three pages 1002a~1002c. The pages 1002a~1002c all store block type information of "active block" and a physical block number of "Y". In addition, because the active block 1002 stores update data for the data block 1001, the pages 1002a~1002c also store a data-source physical block number "X" of corresponding data block 1001. A block 1003 has a block type of "data block" and a physical block number Z and comprises five pages 1003a~1003e. Actually, the block 1003 is a garbage collection block containing integrated data of the data block 1001 and the active block 1002. Therefore, the page 1003a derived from the page 1002c stores block type information of "active block", a physical block number of "Y", and a data-source physical block number "X" of corresponding data block 1001. The pages 1003b~1003c derived from the pages 1001b~1001c store block type information of "data block" and a physical block number of "X". The pages 1003d~1003e store block type information of "data block" and a physical block number of "Z".

The block 1004 has a block type of "active block" and a physical block number Q and is an active block storing update data for the data block 1003. The active block 1004 comprises three pages 1004a~1004c. Similarly, the three pages 1004a~1104c store block type information "active block" of the active block 1004, a physical block number "Z" of the active block 1004, and a data-source physical block number "Z" of corresponding data block 1003. The block 1005 has a block type of "data block" and a physical block number P. Actually, the block 1005 is a garbage collection block containing integrated data of the data block 1003 and the active block 1004. Therefore, the page 1005a derived from the page 1003a stores block type information of "active block", a physical block number of "Y", and a data-source physical block number "X". The pages 1005b~1005c derived from the pages 1003b~1003c store block type information of "data block" and a physical block number of "X". The page 1005d derived from the update page 1004c of the active block 1004 stores block type information of "active block", a physical block number of "Q", and a data-source physical block number "Z" of corresponding data block 1003. The page 1005e derived from the page 1003e stores block type information of "data block" and a physical block number of "Z". The page 1005f stores block type information of "data block" and a physical block number of "P" of the block 1005.

Figure 11:
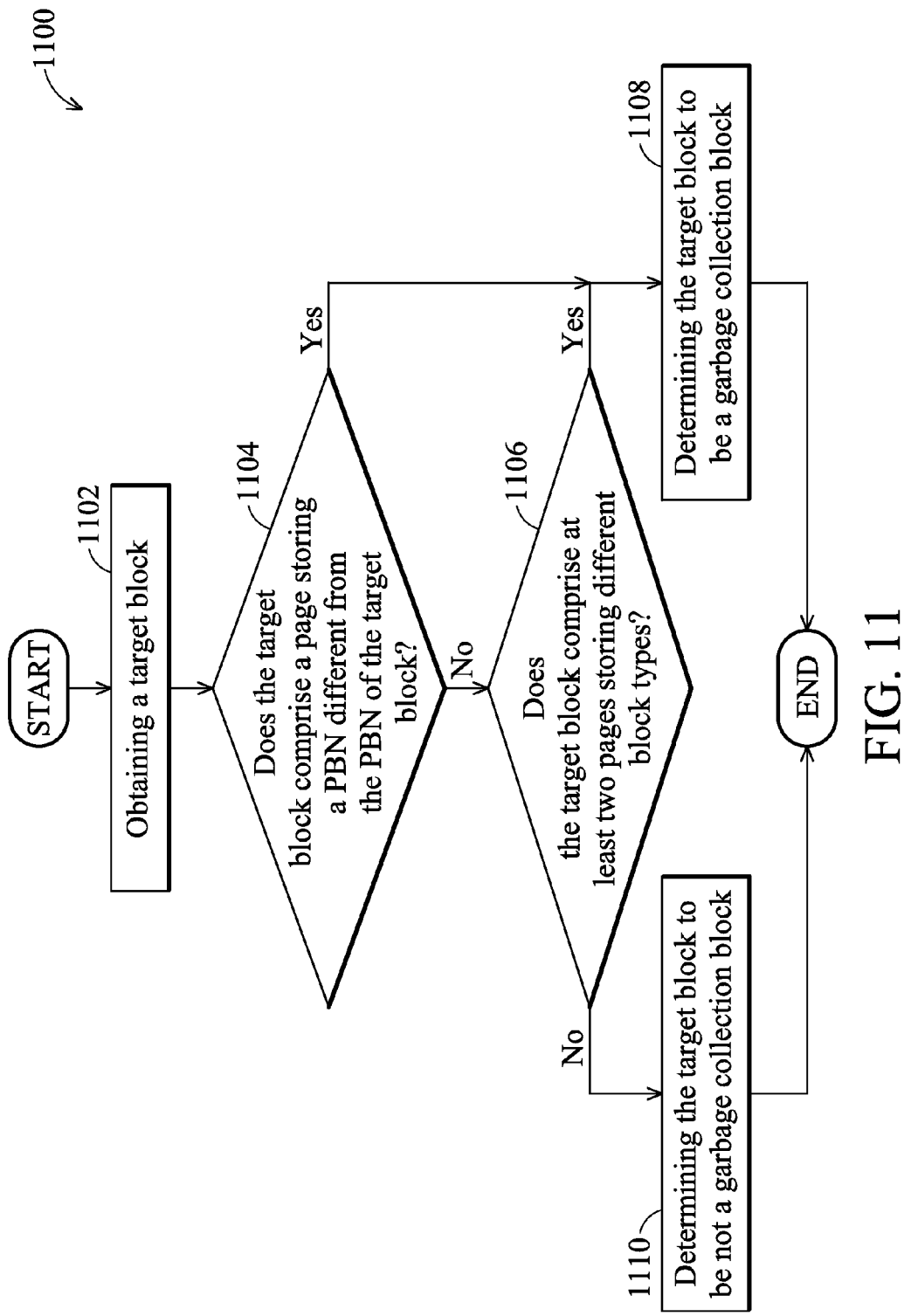
FIG. 11 is a flowchart of a method for determining whether a target block is a garbage collection block.

The microcontroller 102 can first determine whether the blocks 1001~1005 are garbage collection blocks according to a method 1100 shown in FIG. 11. All steps of the method 1100 shown in FIG. 11 are the same as those of the method 700 shown in FIG. 7. For example, all of the pages 1001a~1001c of the data block 1001 store a physical block number X which is the physical block number of the block 1001, and all pages 1001a~1001c of the block 1001 store the same block type information of "data block". The block 1001 is therefore not a garbage collection block. Similarly, all of the pages 1002a~1002c of the block 1002 store a physical block number Y which is the physical block number of the block 1002, and all pages 1002a~1002c of the block 1002 store the same block type information of "active block". The block 1002 is therefore not a garbage collection block. Similarly, the block 1004 is also determined not to be a garbage collection block. The block 1003, however, comprises a page 1003a storing a physical block number Y which is different from the physical block number Z of the block 1003, and page 1003b and 1003c store physical block numbers X which are different from the physical block number Z of the block 603. In addition, the block 1003 comprises a page 1003a storing a block type information of "active block" which is different from the block type information "data block" of pages 1003b~1003e. Thus, the microcontroller 102 determines that the block 1003 is a garbage collection block. Similarly, the block 1005 is also determined to be a garbage collection block.

Figure 12:
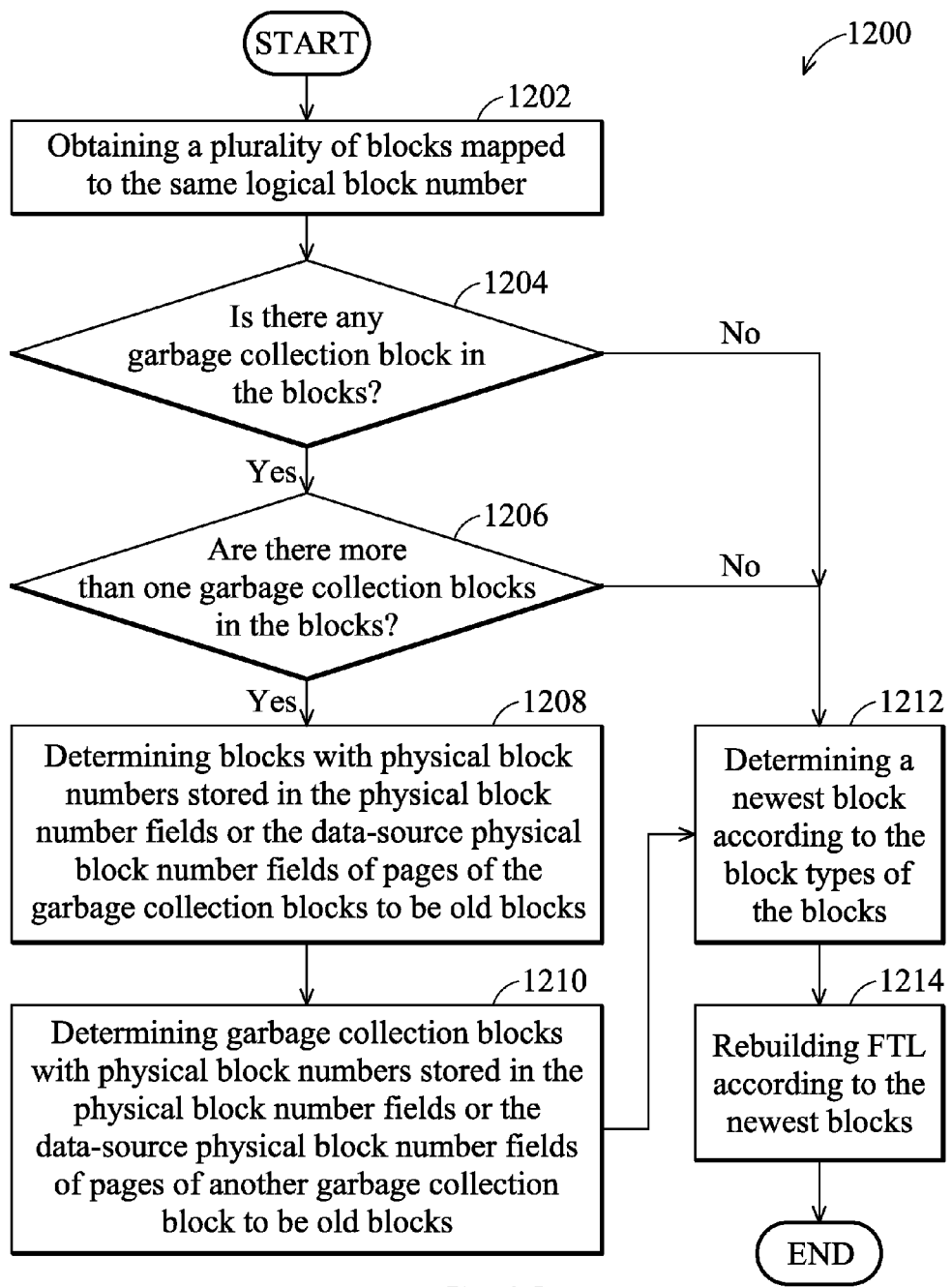
FIG. 12 is a flowchart of a method for determining a newest block from a plurality of blocks corresponding to a logical block number.

The microcontroller 102 therefore determines the block 1003 and 1005 shown in FIG. 10 to be garbage collection blocks. Referring to FIG. 12, a flowchart of a method 1200 for determining a newest block from a plurality of blocks corresponding to a logical block number is shown. First, the microcontroller 102 obtains a plurality of blocks 1001~1005 corresponding to a logical block number (step 1202). The microcontroller 102 then determines whether there is any garbage collection block in the blocks 1001~1005 (step 1204). According to the method 1100 shown in FIG. 11, only the blocks 1003 and 1005 are determined to be garbage collection blocks. The microcontroller 102 further determines whether there is more than one garbage collection blocks in the blocks 1001~1005 (step 1206). If there is only one block determined to be a garbage collection block, the microcontroller 102 determines the garbage collection block to be the newest block (i.e. the 'No' path after the decision step 1206). For example, if there are only three blocks 1001~1003 corresponding to a logical block number, the block 1203 is the only garbage collection block, and the block 1003 is determined to be the newest block.

Otherwise, if there are more than one block determined to be garbage collection blocks (step 1206), when physical block numbers or data-source physical block numbers stored in pages of the garbage collection blocks are not equal to a physical block number of the garbage collection blocks, the microcontroller 102 determines the blocks with physical block numbers stored in the physical block number fields or the data-source physical block number fields of the pages of the garbage collection blocks to be old blocks (step 1208). For example, because the pages 1003a and 1003b of the garbage collection block 1003 respectively store physical block numbers Y and X which are the physical block numbers of the blocks 1002 and 1001, and the blocks 1001 and 1002 are determined to be old blocks. In addition, the microcontroller 102 further determines garbage collection blocks with physical block numbers stored in the physical block number fields or the data-source physical block number fields of the pages of another garbage collection block to be old blocks (step 1208). For example, because the page 1005d of the garbage collection block 1005 stores a data-source physical block number Z which is the physical block number of another garbage collection block 1003, and the page 1205e storing a physical block number Z which is the physical block number of another garbage collection block 1003, the microcontroller 102 determines the block 1003 to be an old block. Because the old blocks are determined from the blocks 1001~1005, the microcontroller 102 can then determine a newest block 1005 from the blocks 1001~1005 (step 1212), and then rebuilds the flash-translation-layer (FTL) data according to data stored in the newest block 1005 (step 1214).

Figure 13:
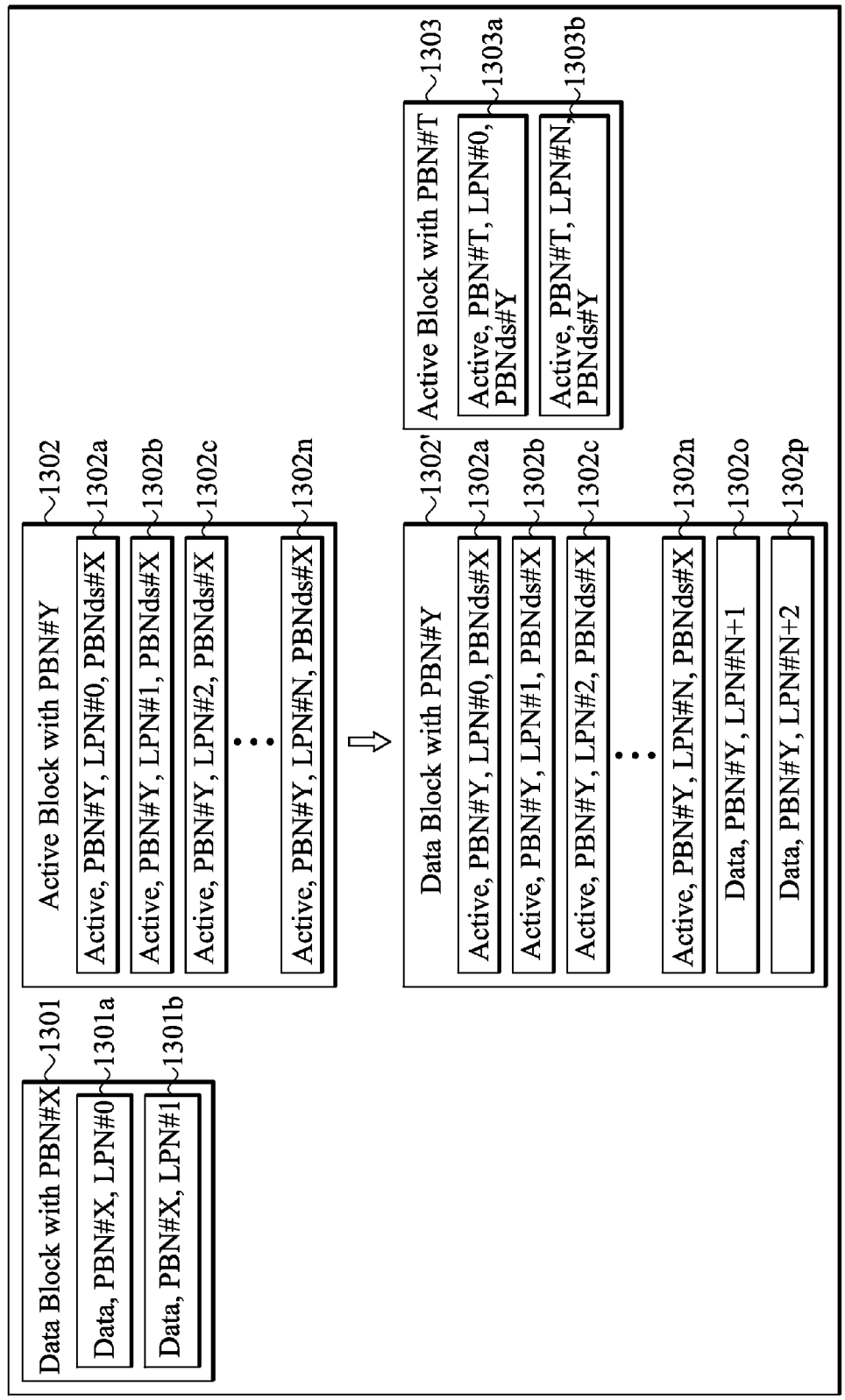
FIG. 13 is a schematic diagram of an embodiment shows an active block being switched to a data block.

Referring to FIG. 13, a schematic diagram of an embodiment shows an active block 1302 being switched to a data block 1302'. A data block 1301 corresponds to a logical block number X. Data stored in the data block 1301 is then updated. The active block 1302 is then built to store update data of the data block 1301. The pages 1302a~1302d therefore store a data-source physical block number X of the data block 1301. The microcontroller 102 then switches the active block 1302 to the data block 1302'. Because the block type of the block 1302' has been changed from "active block" to be "data block", new pages 1302o and 1302p of the block 1302' store block type information of "data block". Data stored in the data block 1302' is then updated. The microcontroller 102 then builds an active block 1303 to store update data of the data block 1302'. When the microcontroller 102 stores update data to pages 1303a and 1303b of the active block 1303, the microcontroller 102 also writes a data-source physical block number Y of the block 1302' to the pages 1303a and 1303b of the active block 1303. Because the pages 1303a and 1303b store the data-source physical block number Y of the data block 1302', the microcontroller 102 can then determines that the active block 1303 is newer than the data block 1302' according to the method 1200 shown in FIG. 12.

Figure 14:
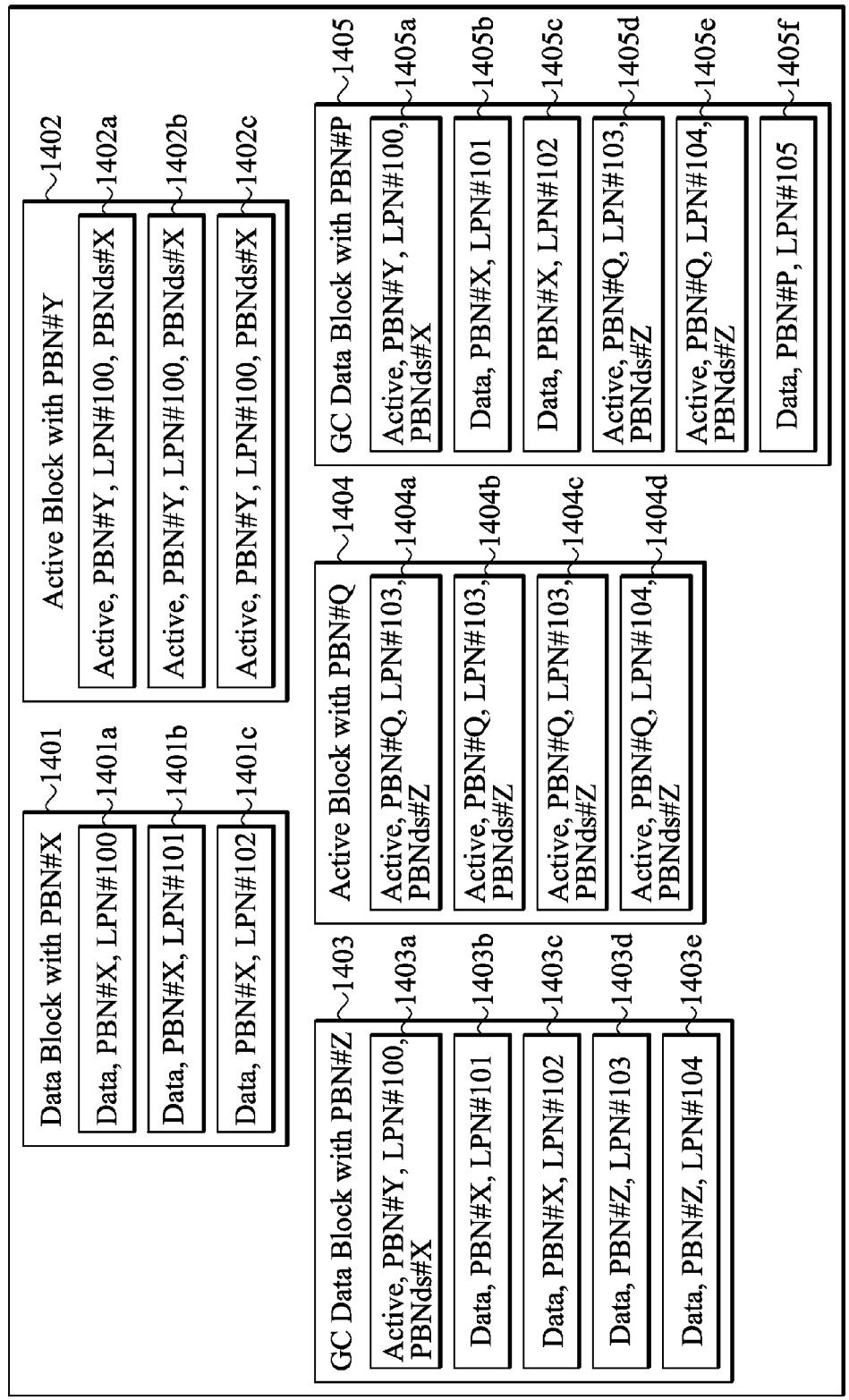
FIG. 14 is a schematic diagram of another embodiment of a plurality of blocks corresponding to a logical block number.

Referring to FIG. 14, a schematic diagram of another embodiment of a plurality of blocks 1401~1405 corresponding to a logical block number is shown. The blocks 1401, 1403, and 1405 are data blocks, and the blocks 1402 and 1404 are active blocks. The blocks 1401, 1402, 1403, 1404, and 1405 respectively have physical block numbers of X, Y, Z, Q, and P. The microcontroller 102 can then determines old blocks from the blocks 1401~1405 according to the method 1200 shown in FIG. 12. The page 1403a of the block 1403 stores a physical block number Y of the block 1402 and a data-source physical block number X of the block 1401. Thus, the blocks 1401 and 1402 are old blocks in comparison with the block 1403 according to the step 1208 of the method 1200. Similarly, because the pages 1404a~1404d store a data-source physical block number Z of the block 1403, the block 1403 is an old block in comparison with the block 1404 according to the step 1208 of the method 1200. In addition, the pages 1405d and 1405e of the block 1400 store a physical block number Q of the block 1404 and a data-source physical block number Z of the block 1403. The microcontroller 102 therefore determines that the blocks 1403 and 1404 are old blocks in comparison with the block 1405 according to the step 1210 of the method 1200. Because the blocks 1401~1404 are all old blocks, the microcontroller 102 can then determine that the block 1405 is a newest block and then rebuilds a FTL data according to the data stored in the newest block 1405.

Figure 15:
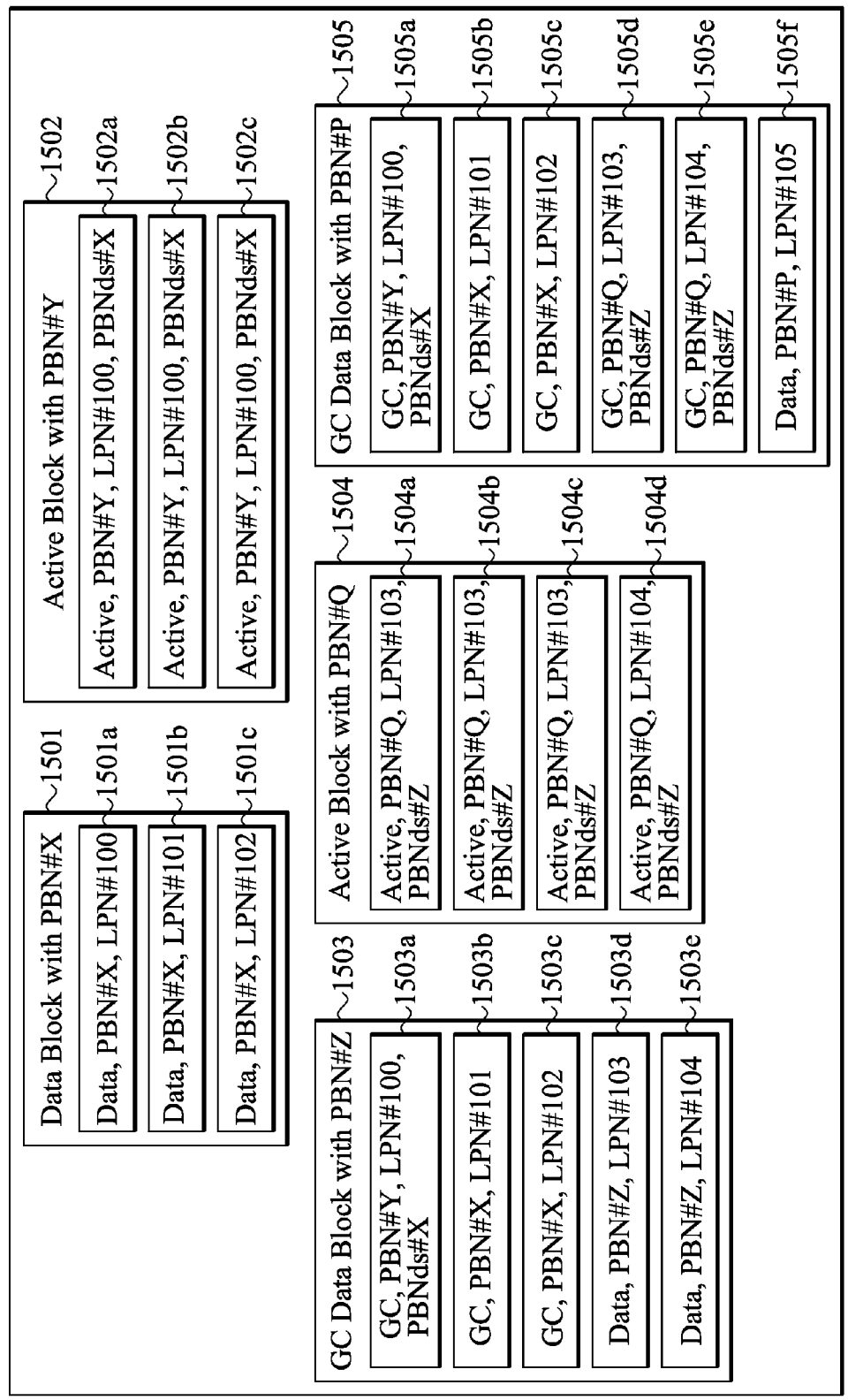
FIG. 15 is a schematic diagram of an embodiment of blocks according to the invention.

In the aforementioned embodiments, there are only two block types including a data block type and an active block type. If there is a third block type of a garbage collection block type for indicating a garbage collection block, and the block type information is written to pages of the garbage collection block, the microcontroller 102 can directly determine the type of the herbage collection according to the block type information stored in the pages. Referring to FIG. 15, a schematic diagram of an embodiment of blocks 1501~1505 according to the invention is shown. The block 1501 is a data block. The blocks 1502 and 1504 are active blocks. The blocks 1503 and 1505 are garbage collection blocks. The pages 1503a, 1503b, and 1503c therefore store block type information of a garbage collection block type, and the microcontroller 102 can therefore determine that the block 1503 is a garbage collection block without the method 1100 shown in FIG. 11. Similarly, the pages 1505a, 1505b, 1505c, 1505d, and 1505e store block type information of a garbage collection block type, and the microcontroller 102 can therefore determine that the block 1505 is a garbage collection block without the method 1100 shown in FIG. 11.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for data recovery, wherein a memory comprises a plurality of pages for data storage, a random access memory stores flash-translation-layer (FTL) data according to a mapping relationship between logical addresses and physical addresses of the pages, and the memory stores a previous version of the FTL data, comprising:
   obtaining first data from a host;
   selecting a first page for storing the first data from the pages of the memory;
   storing a start page link indicating the first page in the memory;
   writing the first data, a first page link indicating a next page, and first FTL fragment data corresponding to the first page into the first page;
   obtaining next data from the host; and
   writing the next data, a next page link indicating a subsequent page, and FTL fragment data corresponding to the next page into the next page.

2. The method as claimed in claim 1, wherein the steps for writing the next data, the next page link, and the FTL fragment data are repeatedly performed until the host does not send the new data.

3. The method as claimed in claim 1, wherein the method comprises:
   after power of the memory is recovered, determining the first page according to the start page link stored in the memory;
   reading the first page to obtain the first FTL fragment data corresponding to the first page;
   determining the next page according to the first page link of the first page;
   reading the next page to obtain the FTL fragment data corresponding to the next page;
   repeatedly determining a new next page according to the next page link of the current next page and reading the new next page to obtain the FTL fragment data corresponding to the new next page until the next page link of the current next page points to null;
   integrating the first FTL fragment data and all of the FTL fragment data together to obtain FTL patch data; and
   combining the previous version of the FTL data stored in the memory with the FTL patch data to obtain a latest version of the FTL data.

4. The method as claimed in claim 3, wherein the method further comprises:
   converting logical addresses received from the host into physical addresses according to the latest version of the FTL data; and
   accessing data stored in the memory according to the physical addresses.

5. The method as claimed in claim 1, wherein the first FTL fragment data corresponding to the first page is compressed FTL data corresponding to the first page, and the FTL fragment data corresponding to the next page is compressed FTL fragment data corresponding to the next page.

6. A device capable of data recovery, comprising:
a memory, comprises a plurality of pages for data storage;
a random access memory, storing flash-translation-layer (FTL) data according to a mapping relationship between logical addresses and physical addresses of the pages; and
a microprocessor, obtaining first data from a host, selecting a first page for storing the first data from the pages of the memory, storing a start page link indicating the first page in the memory, writing the first data, a first page link indicating a next page, and first FTL fragment data corresponding to the first page into the first page, obtaining next data from the host, and writing the next data, a next page link indicating a subsequent page, and FTL fragment data corresponding to the next page into the next page.

7. The device as claimed in claim 6, wherein the microprocessor repeatedly obtains new next data from the host and writes the new next data, a new next page link, and new FTL fragment data to a new next page until the host does not send the new next data to the device.

8. The device as claimed in claim 6, wherein after power of the device is recovered, the microprocessor determines the first page according to the start page link stored in the memory, reads the first page to obtain the first FTL fragment data corresponding to the first page, determines the next page according to the first page link of the first page, reads the next page to obtain the FTL fragment data corresponding to the next page, repeatedly determines a new next page according to the next page link of the current next page and reads the new next page to obtain the FTL fragment data corresponding to the new next page until the next page link of the current next page points to null, integrates the first FTL fragment data and all of the FTL fragment data together to obtain FTL patch data, and combines the previous-version FTL data stored in the memory with the FTL patch data to obtain a latest version of the FTL data.

9. The device as claimed in claim 8, wherein the microprocessor converts logical addresses received from the host into physical addresses according to the latest version of the FTL data, and accesses data stored in the memory according to the physical addresses.

10. The device as claimed in claim 6, wherein the first FTL fragment data corresponding to the first page is compressed FTL data corresponding to the first page, and the FTL fragment data corresponding to the next page is compressed FTL data corresponding to the next page.

11. A method for data recovery for a flash device, wherein a flash memory of the flash device comprises a plurality of pages for data storage, a random access memory stores flash-translation-layer data recording to a mapping relationship between logical addresses and physical addresses of the pages, and the flash memory stores a previous version of the FTL data, comprising:
obtaining first data from a host;
selecting a first page for storing first data from the pages of the flash memory;
writing the first data, a first page link indicating the previous version of the FTL data, and first FTL fragment data corresponding to the first page into the first page;
obtaining next data from the host; and
writing the next data, a previous page link indicating the first page, and FTL fragment data corresponding to a next page into the next page.

12. The method as claimed in claim 11, wherein the method further comprises:
obtaining new next data from the host;
writing the new next data, a previous page link indicating a previous page, and FTL fragment data corresponding to the new next page to the new next page; and
repeating the steps for obtaining new next data from the host and writing the new next data, the previous page link, and the FTL fragment data to the new next page continuously, until the host does not send new data to the flash device.

13. The method as claimed in claim 11, wherein the method comprises:
after power of the flash device is recovered, searching the pages of the flash memory for a last page;
reading the last page to obtain the FTL fragment data corresponding to the last page;
determining a previous page according to a last page link of the last page;
reading the previous page to obtain the FTL fragment data corresponding to the previous page;
repeatedly determining a new previous page according to the previous page link of the current previous page and reading the new previous page to obtain the FTL fragment data corresponding to the new previous page until the previous page link of the current previous page indicates the first page;
integrating the first FTL fragment data and all of the FTL fragment data together to obtain FTL patch data; and
combining the previous version of the FTL data stored in the flash memory with the FTL patch data to obtain a latest version of the FTL data.

14. The method as claimed in claim 13, wherein the method further comprises:
converting logical addresses received from the host into physical addresses according to the latest version of the FTL data; and
accessing data stored in the flash memory according to the physical addresses.

15. The method as claimed in claim 11, wherein the method further comprises:
when power of the flash device is shut down, recording an end page link indicating a last page in a storage device; and
after power of the flash device is recovered, determining the last page according to the end page link stored in the storage device.

16. The method as claimed in claim 11, wherein the first FTL fragment data corresponding to the first page is compressed FTL data corresponding to the first page, and the FTL fragment data corresponding to the next page is compressed FTL data corresponding to the next page.

17. A method for data recovery for a flash device, wherein a flash memory of the flash device comprises a plurality of blocks, and each of the blocks comprises a plurality of pages for data storage, comprising:
when writing data to a target page of a target block selected from the blocks, recording a block type and a physical block number of the target block in the target page;
after power of the flash device is recovered, determining whether the target block is a garbage collection block according to the block types and the physical block numbers stored in the pages of the target block; and
rebuilding flash-translation-layer (FTL) data recorded a mapping relationship between logical numbers and physical numbers according to whether the target block is a garbage collection block.

18. The method as claimed in claim 17, wherein determining of whether the target block is a garbage collection block comprises:
  obtaining the target block;
  determining whether the target block comprises a first page storing a first physical block number that is different from a second physical block number of the target block; and
  when the target block comprises the first page storing the first physical block number that is different from the second physical block number of the target block, determining the target block to be a garbage collection block.

19. The method as claimed in claim 18, wherein determining of whether the target block is a garbage collection block further comprises:
  determining whether the target block comprises at least two second pages storing different block types; and
  when the target block comprises at least two second pages storing different block types, determining the target block to be a garbage collection block.

20. The method as claimed in claim 17, wherein the method further comprises:
  after power of the flash device is recovered, obtaining a plurality of first blocks mapped to a target logical block number;
  determining whether the first blocks are garbage collection blocks;
  when the first blocks comprise only one garbage collection block, determining the garbage collection block to be a new block;
  when the first blocks comprise a plurality of garbage collection blocks, searching the garbage collection blocks for a target garbage collection block comprising pages storing physical block numbers of other garbage collection blocks, and determining the garbage collection block to be the newest block; and
  recording a mapping relationship between the newest block and the target logical block number in the FTL data.

21. The method as claimed in claim 20, wherein the method further comprises:
  when the first blocks comprises a plurality of garbage collection blocks, determining block types of the first block; and
  when the first blocks comprises an active block, determining the active block to be the newest block.

22. The method as claimed in claim 17, wherein the method further comprises:
  when writing data to the target page of the target block selected from the blocks and the target block is an active block storing update data for a data source block, recording a physical block number of the data source block as a data-source physical block number in the target page.

23. The method as claimed in claim 22, wherein the method further comprises:
  after power of the flash device is recovered, obtaining a plurality of first blocks mapped to a target logical block number;
  determining whether the first blocks are garbage collection blocks;
  when the first blocks comprise only one garbage collection block, determining the garbage collection block to be a new block; and
  rebuilding a FTL data according to data stored in the newest block.

24. The method as claimed in claim 23, wherein the method further comprises:
  when the first blocks comprise a plurality of garbage collection blocks, checking whether a plurality of specific physical block numbers or a plurality of specific data-source physical block numbers stored in pages of the garbage collection blocks are not equal to physical block numbers of the garbage collection blocks;
  determining a plurality of old blocks with physical block numbers equal to the specific physical block numbers or the specific data-source physical block numbers stored in the pages of the garbage collection blocks;
  determining a newest block from the first blocks which are not the old blocks; and
  rebuilding a FTL data according to data stored in the newest block.

25. The method as claimed in claim 17, wherein the blocks of the flash memory have block types of a data block, an active block, and a garbage collection block, and the step of recording a block type of the target block in the target page further comprises:
  when the target block is a garbage collection block, recording the block type of the target block to be a garbage collection block in the target page.

26. A device capable of data recovery, comprising:
  a memory, comprising a plurality of blocks, wherein each of the blocks comprises a plurality of pages for data storage; and
  a microcontroller, recording a block type and a physical block number of a target block in a target page when data is written into the target page, determining whether the target block is a garbage collection block according to the block types and the physical block numbers stored in the pages of the target block after power of the device is recovered, and rebuilding flash-translation-layer (FTL) data recorded a mapping relationship between logical numbers and physical numbers according to the determining result.

27. The device as claimed in claim 26, wherein when the target block is determined to be a garbage collection block, the microcontroller obtains the target block, determines whether the target block comprises a first page storing a first physical block number that is different from a second physical block number of the target block, and determines the target block to be a garbage collection block when the target block comprises the first page storing the first physical block number that is different from the second physical block number of the target block.

28. The device as claimed in claim 27, wherein when the target block is determined to be a garbage collection block, the microcontroller further determines whether the target block comprises at least two second pages storing different block types, and determines the target block to be a garbage collection block when the target block comprises at least two second pages storing different block types.

29. The device as claimed in claim 26, wherein the microcontroller obtains a plurality of first blocks mapped to a target logical block number after power of the device is recovered, determines whether the first blocks are garbage collection blocks, determines the garbage collection block to be a new block when the first blocks comprise only one garbage collection block, searches the garbage collection blocks for a target garbage collection block comprising pages storing physical block numbers of other garbage collection blocks, and determines the garbage collection block to be the newest block when the first blocks comprise a plurality of garbage collection blocks, and records a mapping relationship between the newest block and the target logical block number in the FTL data.

30. The device as claimed in claim 29, wherein the microcontroller further determines block types of the first block when the first blocks comprises a plurality of garbage collection blocks, and determines the active block to be the newest block when the first blocks comprises an active block.

31. The device as claimed in claim 26, wherein when data is written into the target page of the target block selected from the blocks and the target block is an active block storing update data for a data source block, the microcontroller records a physical block number of the data source block as a data-source physical block number in the target page.

32. The device as claimed in claim 31, wherein the microcontroller obtains a plurality of first blocks mapped to a target logical block number after power of the device is recovered, determines whether the first blocks are garbage collection blocks, determines the garbage collection block to be a new block when the first blocks comprise only one garbage collection block, and rebuilds a FTL data according to data stored in the newest block.

33. The device as claimed in claim 32, wherein when the first blocks comprise a plurality of garbage collection blocks, the microcontroller further checks whether a plurality of specific physical block numbers or a plurality of specific data-source physical block numbers stored in pages of the garbage collection blocks are not equal to physical block numbers of the garbage collection blocks, determines a plurality of old blocks with physical block numbers equal to the specific physical block numbers or the specific data-source physical block numbers stored in the pages of the garbage collection blocks, determines a newest block from the first blocks which are not the old blocks, and rebuilds a FTL data according to data stored in the newest block.

34. The device as claimed in claim 26, wherein the blocks of the memory have block types of a data block, an active block, and a garbage collection block, and the microcontroller records the block type of the target block to be a garbage collection block in the target page when the target block is a garbage collection block.

\* \* \* \* \*